US012488325B2

(12) United States Patent
Schäfer et al.

(10) Patent No.: US 12,488,325 B2
(45) Date of Patent: Dec. 2, 2025

(54) SELF-SERVICE TERMINAL AND METHOD

(71) Applicant: Wincor Nixdorf International GmbH, Paderborn (DE)

(72) Inventors: Oliver Schäfer, Schönwalde-Glien (DE); Alexander Pusch, Berlin (DE); Alexander Knobloch, Bad Bramstedt (DE)

(73) Assignee: WINCOR NIXDORF INTERNATIONAL GMBH, Paderborn (DE)

( * ) Notice: Subject to any disclaimer, the term of this patent is extended or adjusted under 35 U.S.C. 154(b) by 72 days.

(21) Appl. No.: 18/019,402

(22) PCT Filed: Jul. 22, 2021

(86) PCT No.: PCT/EP2021/070562
§ 371 (c)(1),
(2) Date: Feb. 2, 2023

(87) PCT Pub. No.: WO2022/028909
PCT Pub. Date: Feb. 10, 2022

(65) Prior Publication Data
US 2024/0303621 A1 Sep. 12, 2024

(30) Foreign Application Priority Data
Aug. 3, 2020 (DE) .......................... 102020120426.4

(51) Int. Cl.
*G06Q 20/18* (2012.01)
*G10L 15/22* (2006.01)
*H04R 1/08* (2006.01)

(52) U.S. Cl.
CPC .............. *G06Q 20/18* (2013.01); *G10L 15/22* (2013.01); *H04R 1/08* (2013.01); *G10L 2015/223* (2013.01)

(58) Field of Classification Search
CPC ... G06Q 20/18; G10L 15/22; G10L 2015/223; H04R 1/08
See application file for complete search history.

(56) References Cited

U.S. PATENT DOCUMENTS

| 10,726,681 B1 | 7/2020 | Durieux |
| 2002/0069054 A1 | 6/2002 | Arrowood |

(Continued)

FOREIGN PATENT DOCUMENTS

CN 107507623 A * 12/2017 ............. G10L 15/20

OTHER PUBLICATIONS

International Search Report filed in the corresponding PCT Application (written in German) dated Oct. 27, 2021; 14 pages.

(Continued)

*Primary Examiner* — Florian M Zeender
*Assistant Examiner* — Joseph M Mutschler
(74) *Attorney, Agent, or Firm* — Black McCuskey

(57) ABSTRACT

A self-service terminal (100) can have:—a product-sensing device for sensing a property of a product;—a plurality of acoustic sensors (104a, 104b); and a control device, which is designed for: superposing a signal captured by means of the plurality of acoustic sensors (104a, 104b); determining a voice pattern on the basis of the result of the superposing; outputting information on the basis of the property and on the basis of the voice pattern; wherein the superposing and the position of the plurality of acoustic sensors (104a, 104b) relative to each other are designed such that first components of the signal are attenuated relative to second components of the signal if an origin of the second components is located between the self-service terminal (100) and an origin of the first components.

15 Claims, 13 Drawing Sheets

(56) References Cited

U.S. PATENT DOCUMENTS

| | | |
|---|---|---|
| 2002/0194074 A1 | 12/2002 | Jacobs |
| 2003/0018897 A1 | 1/2003 | Bellis |
| 2013/0287225 A1 | 10/2013 | Niwa |
| 2015/0222996 A1* | 8/2015 | Chu ........................ H04R 25/43 381/313 |
| 2018/0005630 A1* | 1/2018 | May .......................... G07G 1/01 |
| 2018/0358003 A1* | 12/2018 | Calle ...................... G10L 15/063 |
| 2019/0141445 A1 | 5/2019 | Wu |
| 2021/0012788 A1* | 1/2021 | Karimian Azari ...... G10L 25/69 |
| 2021/0125467 A1* | 4/2021 | Yepez .................. G07G 1/0072 |

OTHER PUBLICATIONS

Written Opinion filed in the corresponding PCT Application (written in German) dated Oct. 27, 2021; 6 pages.

Examination Report filed in the corresponding German application dated Mar. 22, 2021; 6 pages.

* cited by examiner

SELF-SERVICE TERMINAL AND METHOD

Various example embodiments relate to a self-service terminal and method.

In conventional retail, a self-service registration terminal offers the customer the option of scanning the desired products themselves (e.g., without assistance) or alternatively having an employee assist them in scanning the products. Such a self-service registration terminal provides an alternative registration and payment process, more anonymity for the customer and lower personnel costs for the retail trade. With a self-service registration terminal, it is not necessarily a cashier who scans the barcodes of the products to be purchased, but rather every customer themselves.

Depending on the location and purpose of use, or the level of technology, voice recognition is also used on such self-service registration terminals in order to make operation easier for the customer. Background noise, so-called interference noise, which is superimposed on the speech input, can make correct speech recognition more difficult. Especially in the public area, in which such self-service registration terminals are used, there are often many people and sound sources present, so that the number of interference noise and the background level can be very large.

This can result in the algorithms used for speech recognition being impaired due to the mixing of speech input (i.e., the useful signal or the operator's utterance) with overlying speech signals (i.e., interference signals, for example from neighboring people or people standing behind). The consequence of the impairment is that either no valid hit is achieved in the recognition attempt (e.g., due to temporal signal overlapping with the interferer and thus excessive alienation of the sound or word to be examined) or an incorrect hit is achieved (e.g., due to the fact that the dominant interference noise closely enough resembles or equals a hit in the comparison database).

This is conventionally counteracted by means of a so-called beam-shaping mechanism (also referred to as a beam-forming mechanism), which brings about an electrical and/or acoustic alignment of the microphone.

According to various embodiments, it was clearly recognized that conventional beam-forming mechanisms only make it possible to "shield" or "limit" signals in a targeted manner to the sides or to suppress signals that are outside of the directional effect. However, the signals from sound sources located one behind the other—e.g., coming from the same direction as the useful signal—remain clearly audible or are retained, or an amplification effect (such as with a directional microphone) can even occur.

More specifically, it has been recognized that a conventional beam-forming mechanism dictates only one direction along which signals are amplified. A beam-forming mechanism is based, for example, on a microphone being focused by a time shift of the sound signals recorded by the respective microphone. The time shift corresponds to the transit time it takes for the sound to reach the microphone. However, the place where the sound is generated is only clearly delimited if this is on an invariant object on which the microphone is focused. If, on the other hand, the exact location of the origin of the sound is unknown, such a transit time compensation cannot satisfy all degrees of freedom. In addition, in the three-dimensional world, all places where the sound is generated are located on a spherical surface around the microphone with a uniform transit time.

If the exact location of the origin of the sound and thus its transit time is unknown, the microphone cannot be easily focused. If the location of the origin of the sound is to be located, this can only be done if there is an unmistakable sound signal that is known. However, this cannot be applied to speech recognition since the speech input to be recognized varies and is therefore a separate degree of freedom. Furthermore, the interference noise is often spoken, so that it cannot be easily distinguished from the actual speech input. Further challenges are therefore that both the useful speech signal and the interference signals can occur at random times and independently of one another or can be similar. Furthermore, the number and distance of the interference source(s) are unknown and can also vary in each case.

According to various embodiments, a self-service terminal and a method are provided which illustratively limit reception in depth, for example in a corridor with minimum and maximum boundaries. This ensures that interference components of the detected noises are weakened relative to useful components of the detected noises if an origin of the useful components (also referred to as useful source) is between the self-service terminal and an origin of the interference components (also referred to as interference source) is located. This mechanism can be used, for example, as an alternative or in addition to a conventional beam-forming mechanism that provides lateral (e.g., horizontal and vertical) directivity in sound reception.

Clearly, more boundary conditions are used than the traditional beam-forming mechanism to provide distance-dependent filtering of the detected sounds (commonly referred to as the detected acoustic signal, or the detected signal for short). The distance-dependent filtering can take place as an alternative or in addition to the direction-dependent filtering of the beam-forming mechanism. Examples of additional boundary conditions can include that the useful source and interference source are located one behind the other and/or at the same height (in the case of people), that the useful source is frontal and/or very behind/in front of the self-service terminal (also known as SB terminal), that the sound pressure and the transit time differ from each other in their dependence on the distance.

Figure 4:
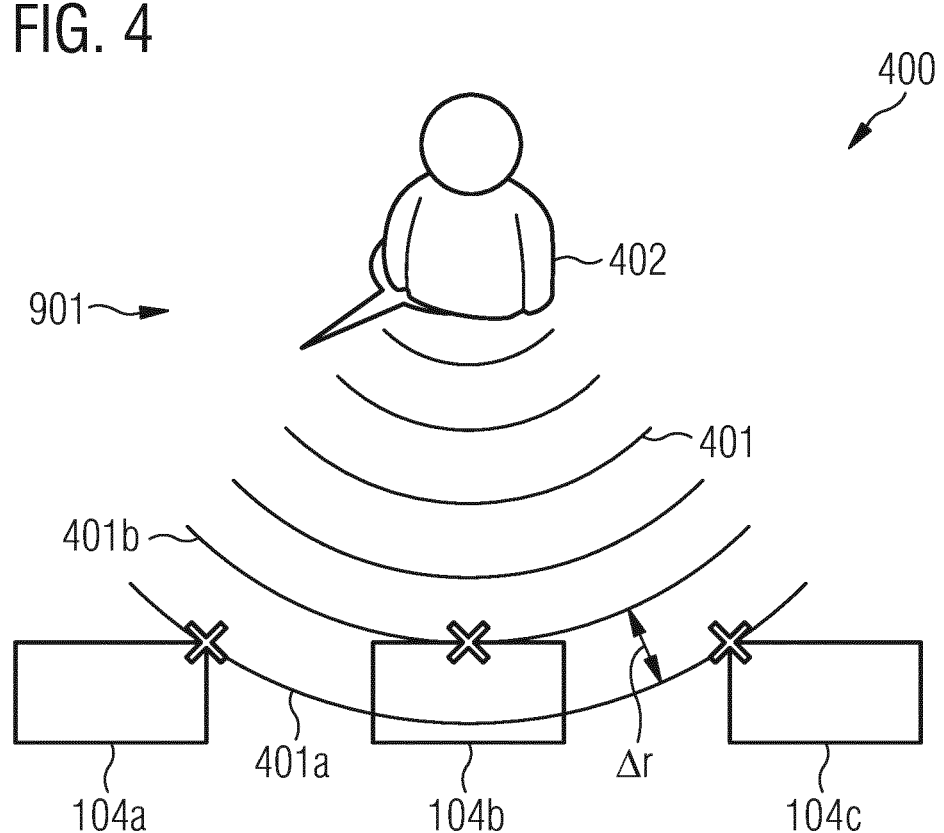
Figure 5:
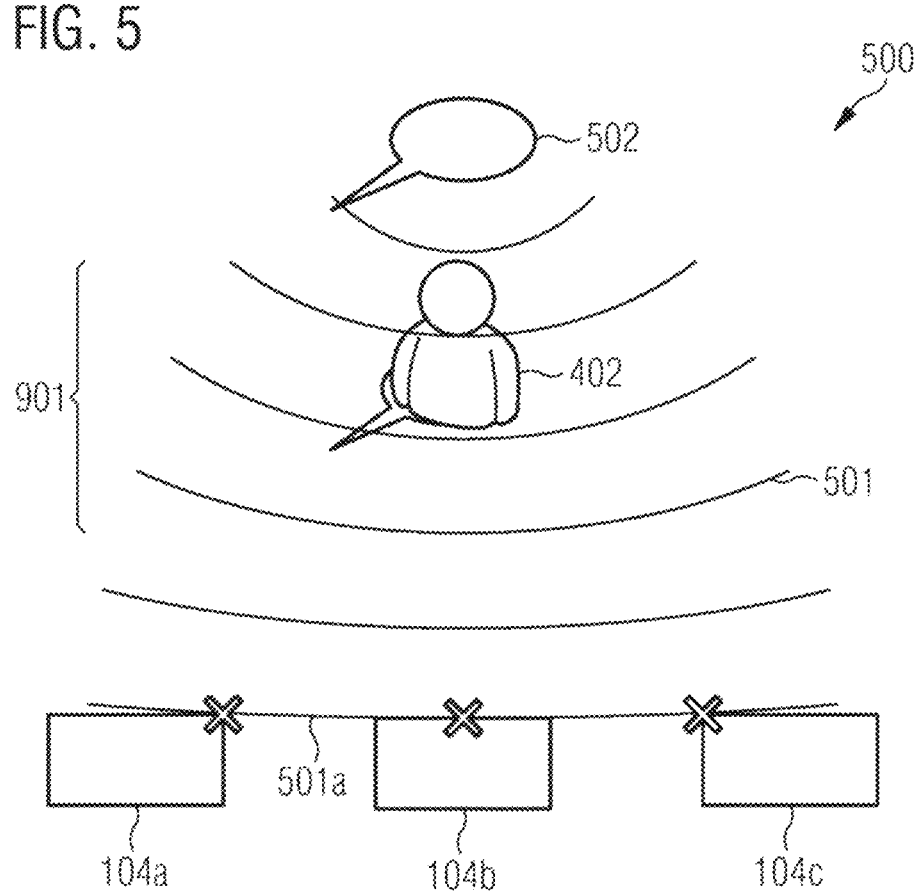
Figure 6A:
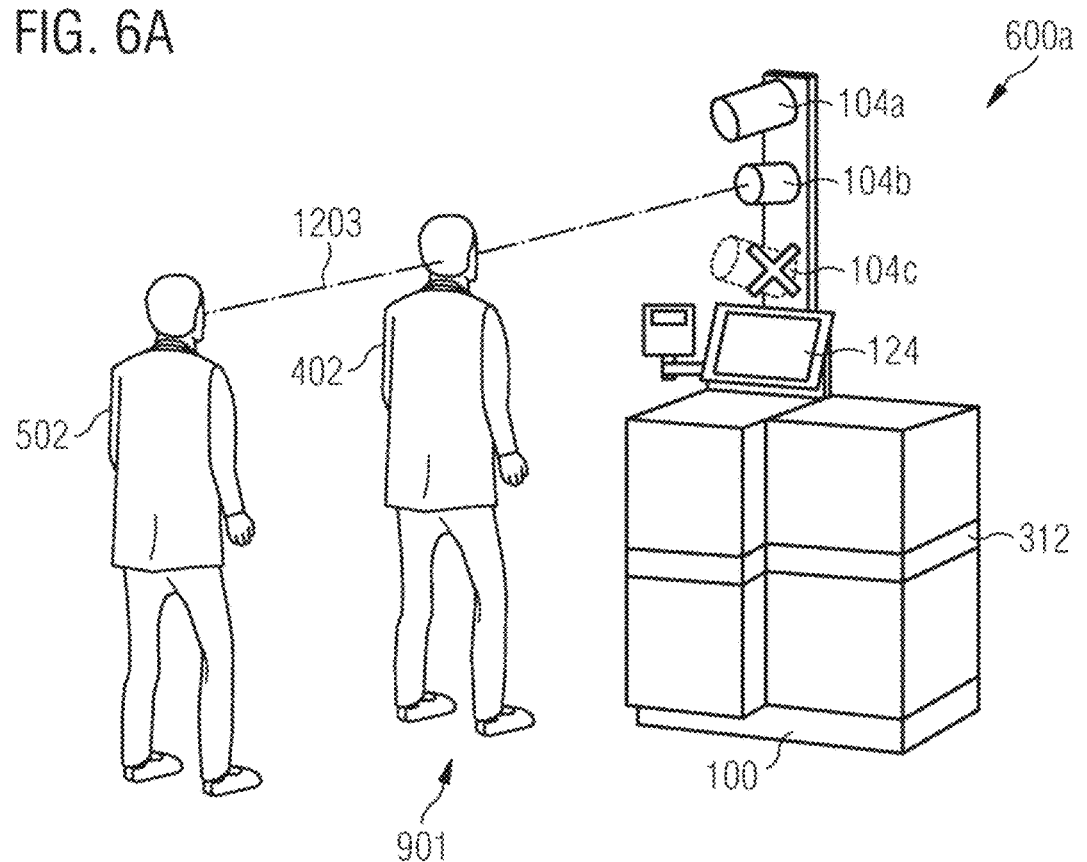
Figure 6B:
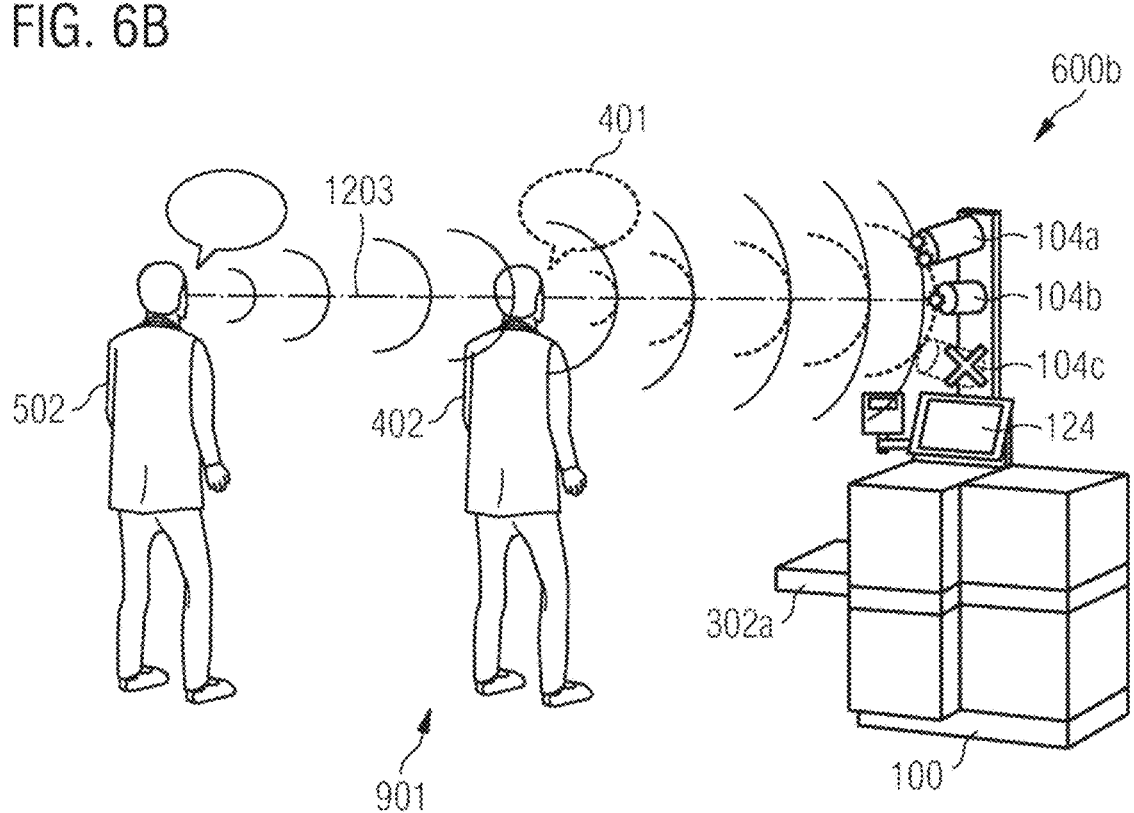
Figure 7A:
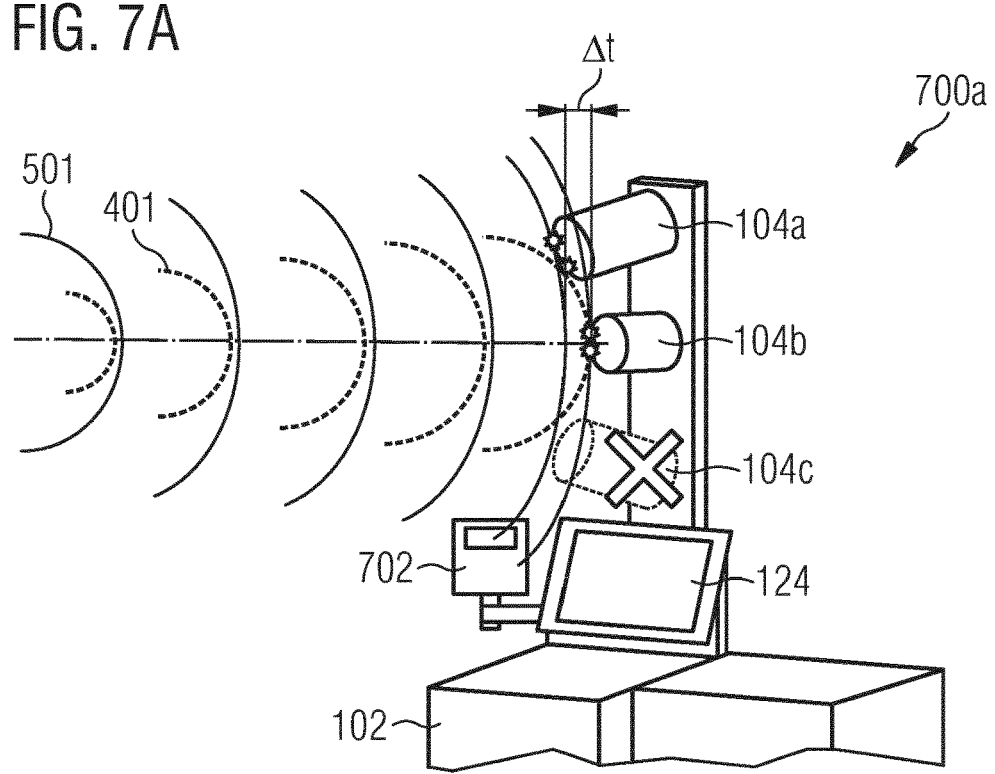
Figure 7B:
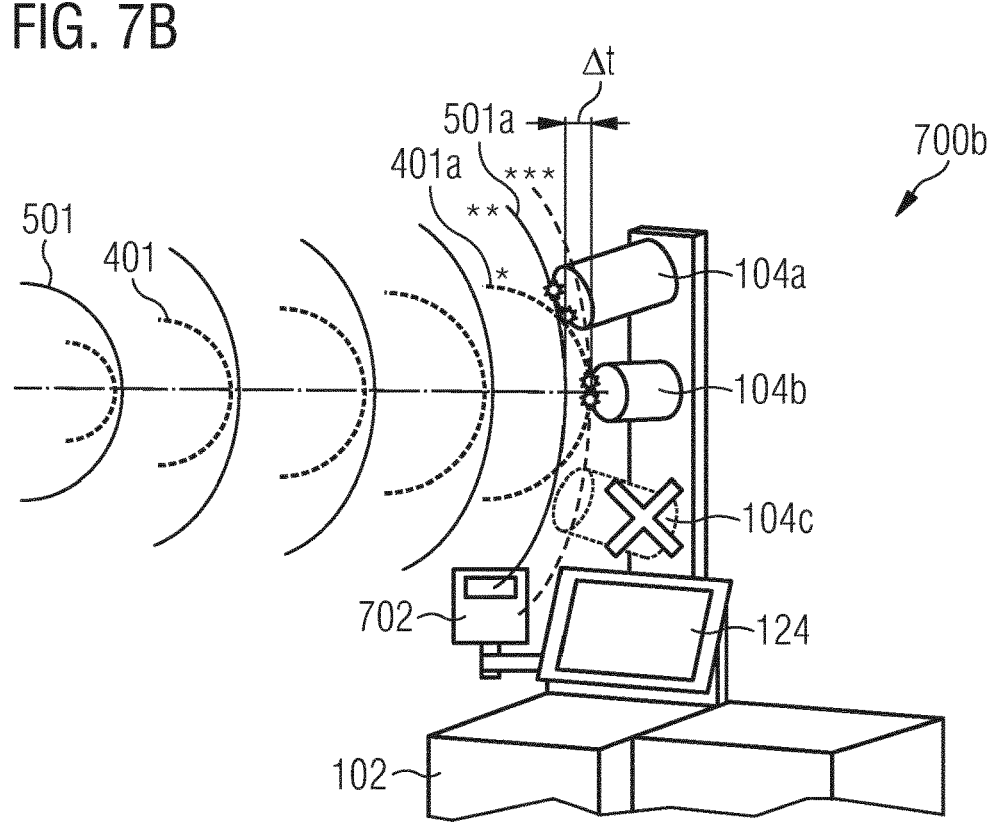
Figure 8A:
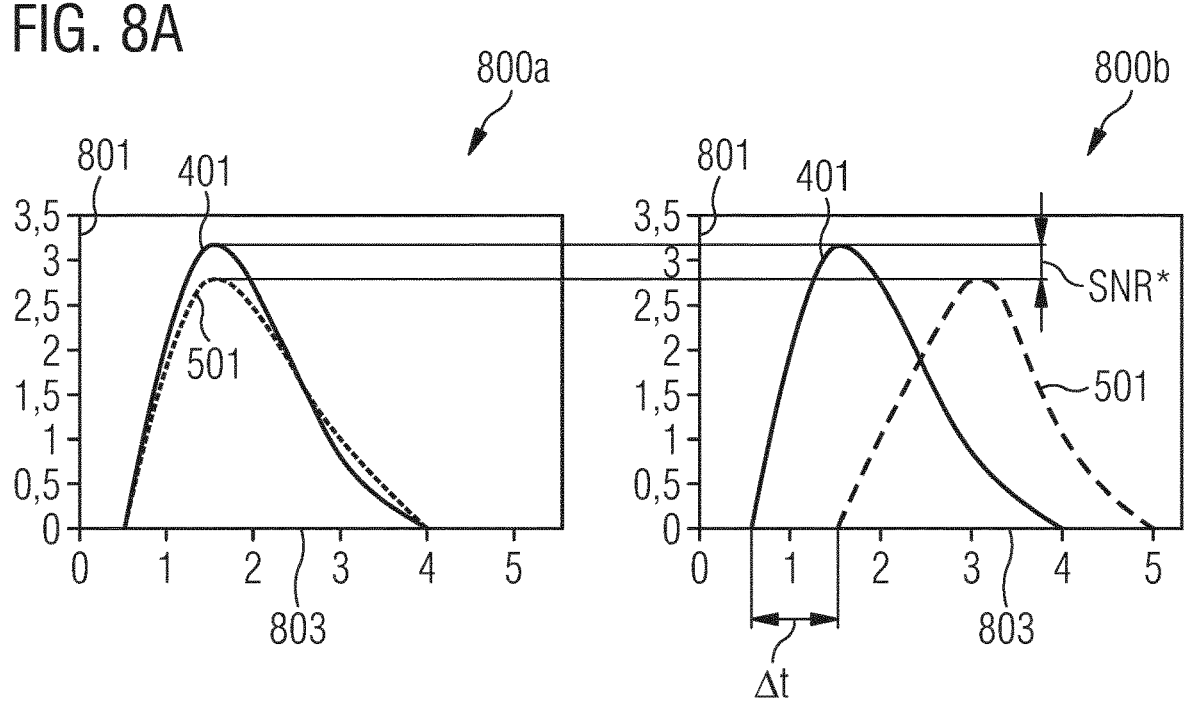
Figure 8B:
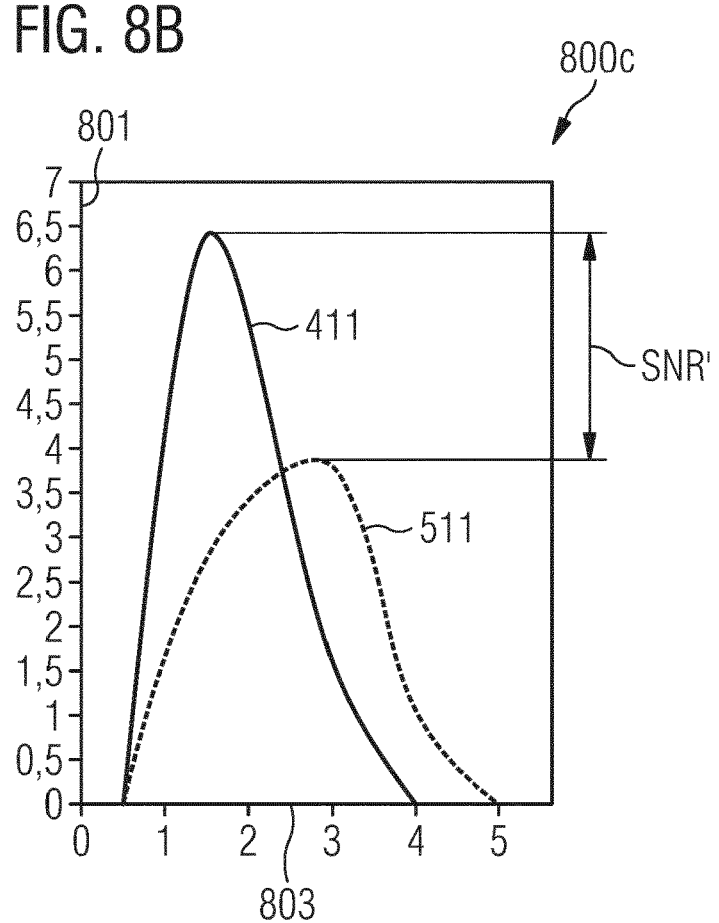
Figure 9A:
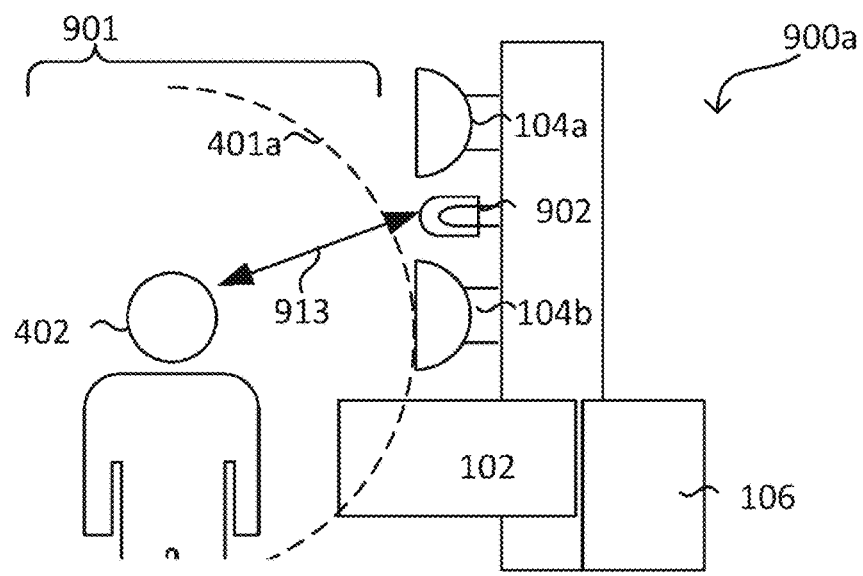
Figure 9B:
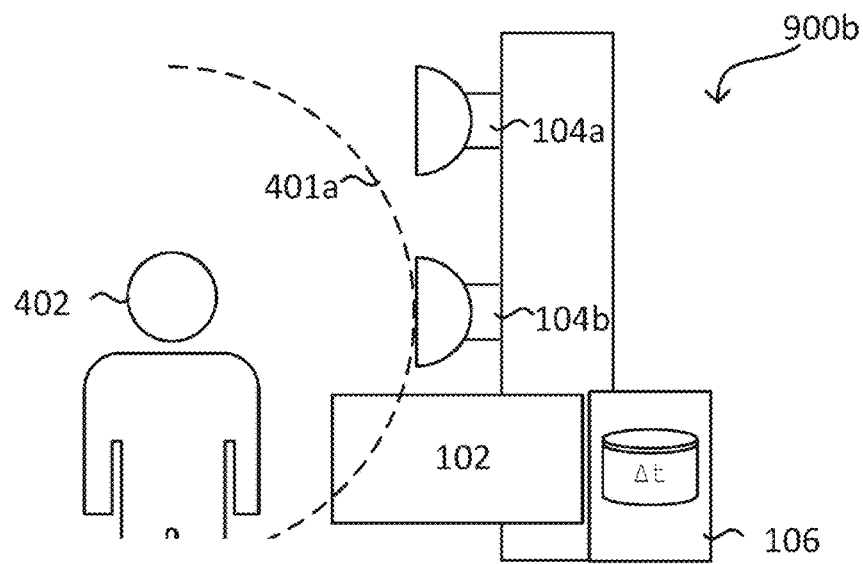
Figure 9C:
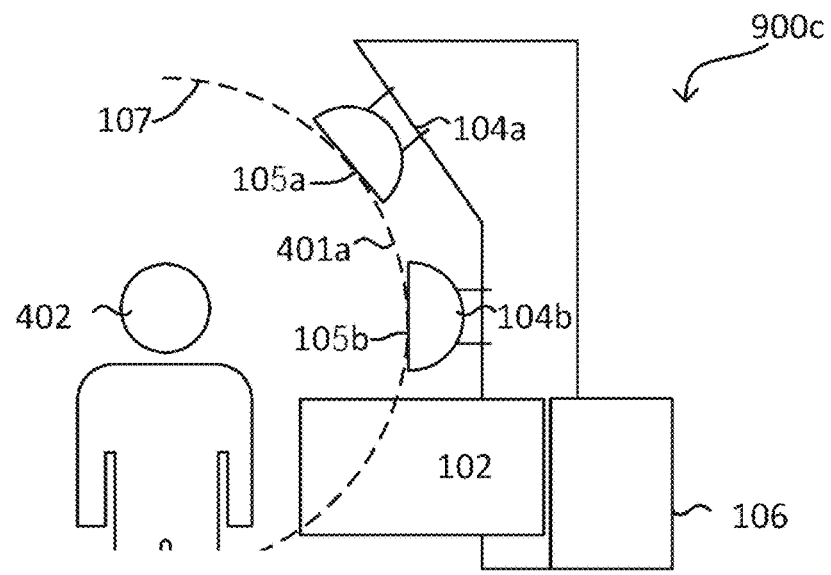
Figure 10:
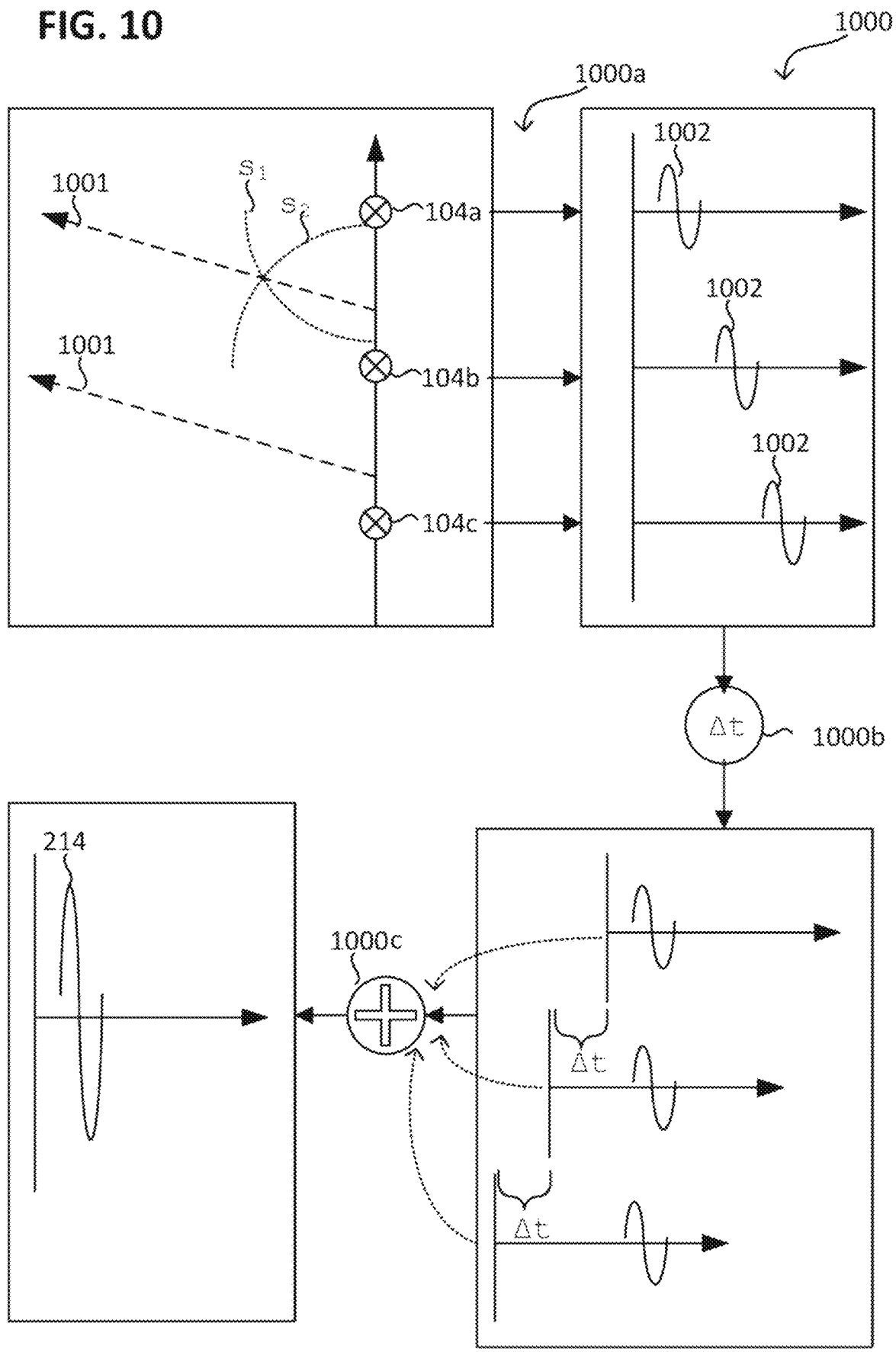
Figure 11:
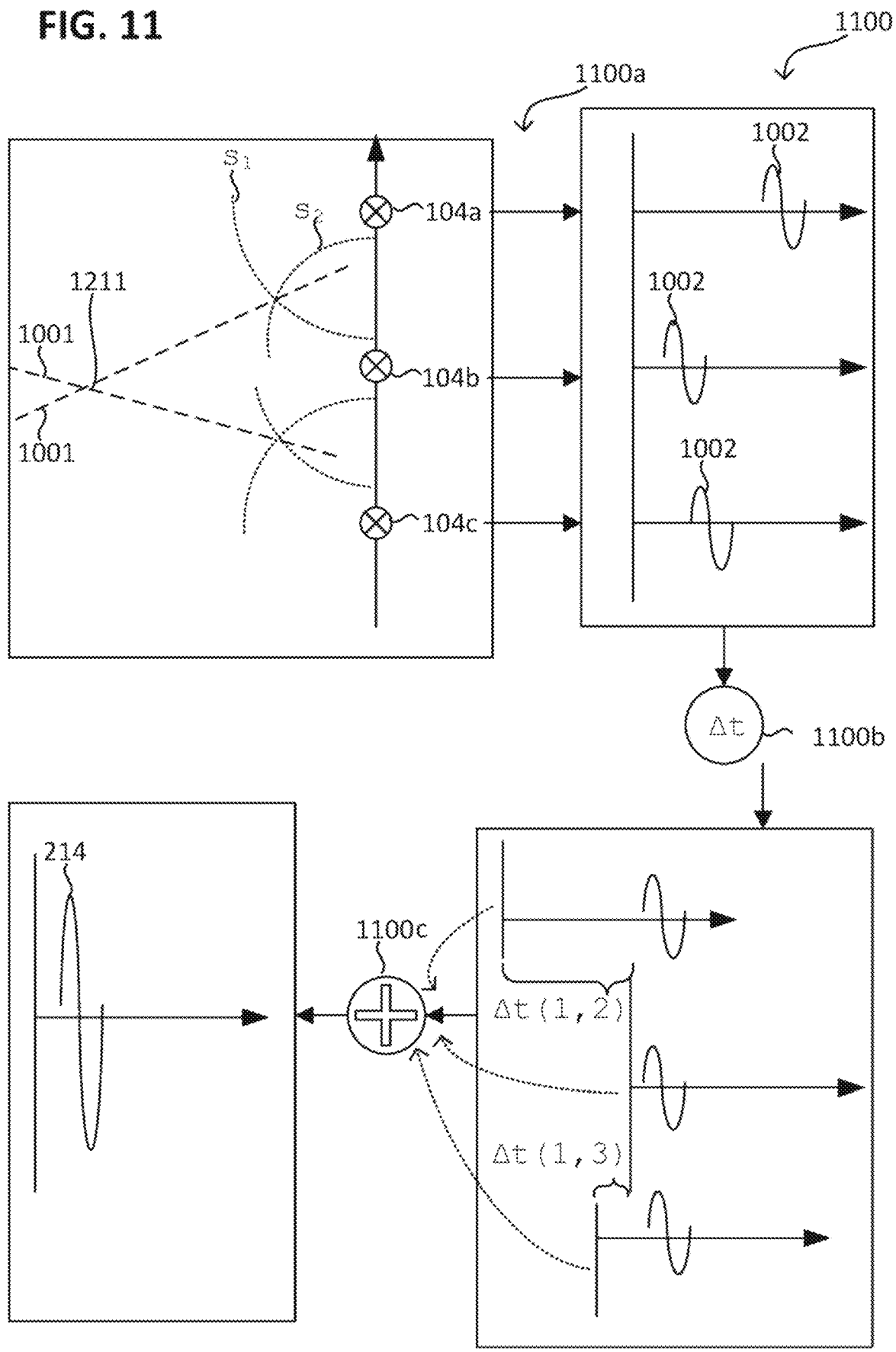
Figure 12A:
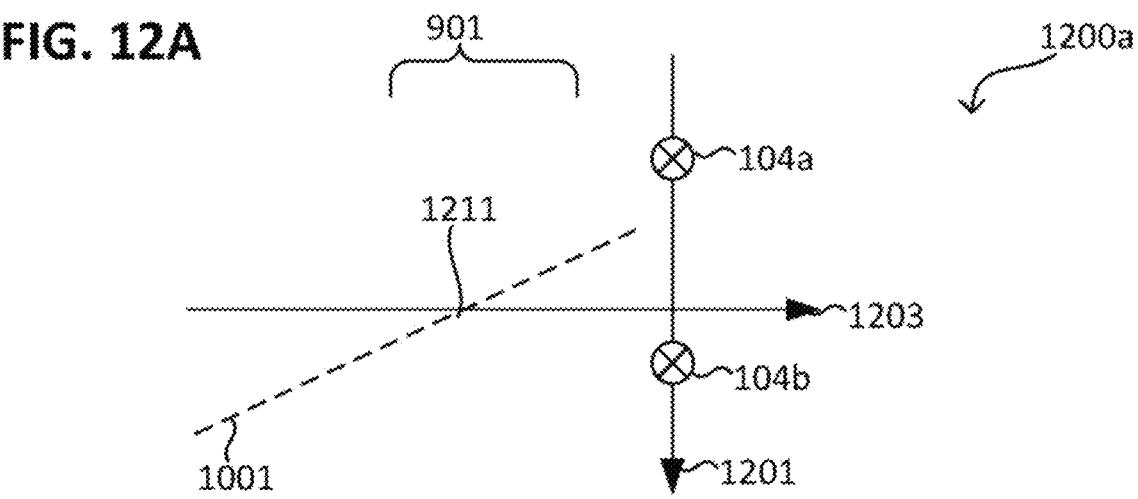
Figure 12B:
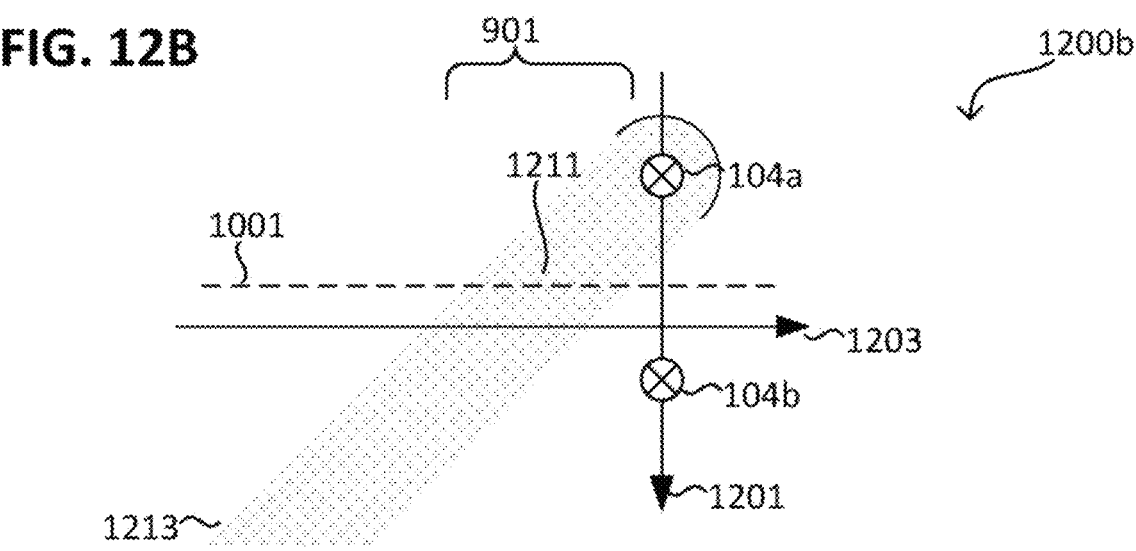
Figure 12C:
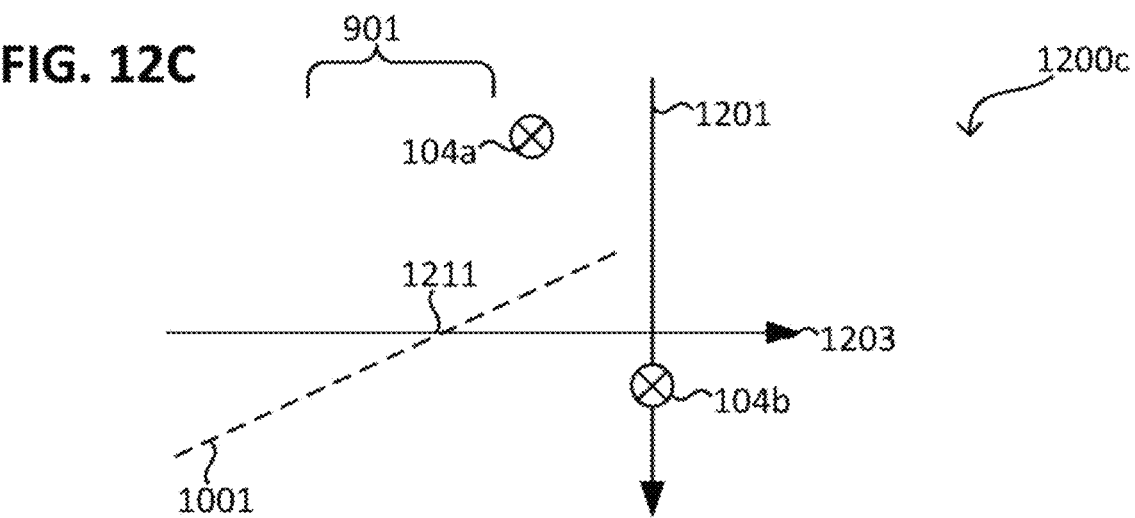
Figure 13:
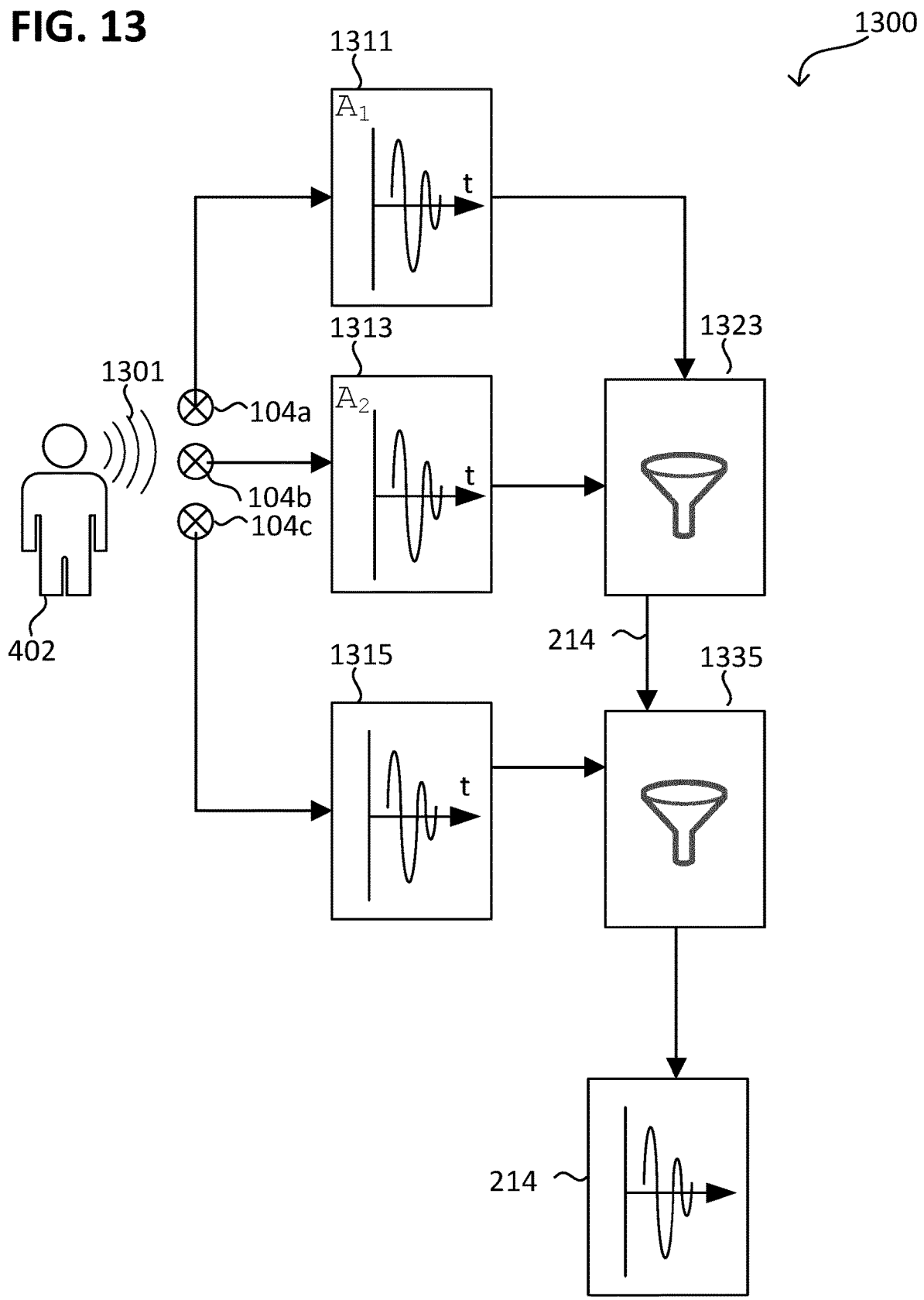

FIG. 4 and FIG. 5 each show the self-service terminal in a method according to various embodiments in a schematic side view or cross-sectional view;

FIG. 6A and FIG. 6B each show the self-service terminal in the method according to various embodiments in schematic perspective views;

FIG. 7A and FIG. 7B each show the self-service terminal in the method according to various embodiments in a schematic detailed view;

FIG. 8A and FIG. 8B each show the method according to different embodiments in different schematic diagrams;

FIG. 9A to FIG. 9C each show the self-service terminal according to various embodiments in a schematic side view;

FIG. 10 and FIG. 11 each show the method according to various embodiments in a schematic flow diagram;

FIG. 12A to FIG. 12C each show a self-service terminal according to various embodiments in a schematic side view; and FIG. 13 shows the method according to various embodiments in a schematic flow diagram;

In the following detailed description, reference is made to the accompanying drawings that form a part hereof, and in which is shown by way of illustration specific embodiments in which the invention may be practiced. In this regard, directional terminology such as "top", "bottom", "front", "back", "anterior", "rear", etc. is used with reference to the orientation of the figure(s) being described. Because components of embodiments can be positioned in a number of different orientations, the directional terminology is used for purposes of illustration and is in no way limiting. It is understood that other embodiments may be utilized and structural or logical changes may be made without departing from the scope of the present invention. It is understood that the features of the various exemplary embodiments described herein can be combined with one another unless specifically stated otherwise. The following detailed description is, therefore, not to be taken in a limiting sense, and the scope of the present invention is defined by the appended claims.

Within the scope of this description, the terms "connected", "linked" and "coupled" are used to describe both a direct and an indirect connection (e.g., ohmic and/or electrically conductive, e.g., an electrically conductive connection), a direct or indirect link and a direct or indirect coupling. In the figures, identical or similar elements are provided with identical reference symbols, insofar as this is appropriate.

The term "control device" may be understood as any type of logic implementing entity, which may include, for example, a circuit and/or a processor, which may execute software stored in a storage medium, in firmware, or in a combination thereof, and can issue instructions based on this. The control device can be configured, for example by means of code segments (e.g., software), in order to control the operation of a system (e.g., its operating point), e.g., a machine or a plant, e.g., its components.

The term "processor" can be understood as any type of entity that allows the processing of data or signals. For example, the data or signals may be treated according to at least one (i.e., one or more than one) specific function performed by the processor. A processor can be an analog circuit, a digital circuit, a mixed-signal circuit, a logic circuit, a microprocessor, a central processing unit (CPU), a graphics processing unit (GPU), a digital signal processor (DSP), a programmable gate array (FPGA), a comprise or be formed from an integrated circuit or any combination thereof. Any other way of implementing the respective functions, which are described in more detail below, can also be understood as a processor or logic circuit. It is understood that one or more of the method steps detailed herein may be performed (e.g., implemented) by a processor, by one or more specific functions performed by the processor. The processor can therefore be set up to carry out one of the methods described herein or its components for information processing.

According to various embodiments, a data store (also more commonly referred to as a storage medium) may be a non-volatile data store. The data memory can, for example, have or be formed from a hard disk and/or at least one semiconductor memory (such as, for example, read-only memory, random access memory and/or flash memory). The read only memory may be, for example, an erasable programmable read only memory (may also be referred to as an EPROM). The random access memory may be non-volatile random access memory (also referred to as NVRAM).

According to various embodiments, a self-service registration terminal (also referred to as SB registration terminal) can be set up to register the products that a customer wants to purchase, e.g., by scanning the products on a scanner (e.g., a barcode scanner). Furthermore, the self-service registration terminal can have a (e.g., digital) cash register system (then also referred to as a self-service checkout), which is set up to carry out a payment process. The payment process can include, for example, that the customer also pays for the products to be purchased. The cash register system may include at least one of the following: a screen (e.g., a touch-sensitive screen), a printer (e.g., for printing an invoice and/or label), a (e.g., programmable) cash register keyboard (may also be part of the touch-sensitive screen), a payment device. The payment device can, for example, have a means of payment reading device for reading out a means of payment (e.g., cash or a debit card). Alternatively or additionally, the payment device can be set up to accept cash.

The means of payment reading device can, for example, be an electronic means of payment reading device (can also be referred to as an EC reading device, "EC"—electronic cash, for example for reading a debit card and/or a credit card). The cash register system and the scanner can be arranged on the same side (e.g., a pillar) of the self-service registration terminal, so that they can be operated from one position.

In the following, products (e.g., goods, can also be referred to as articles) are referred to as objects. By analogy, what has been described can also apply to other objects, such as a hand.

The following refers to the so-called transit time or a difference between transit times (also referred to as transit time difference). The transit time t is the time that the sound needs to travel from the origin of the sound (i.e., the location of the sound source) to a location where the sound is recorded, e.g., to a location of the sensor. The sound covers the distance s (i.e., the path s) from the sound source to the point of detection. For the nth location at which the sound is detected, the transit time $t_n = S_n / C_s$, where $c_s$ is the speed of sound and $t_n$ is the transit time and $s_n$ is the distance for the nth location. The transit time can thus be converted into the distance to the sound source by multiplying it with the speed of sound.

Different detection locations (e.g., n=1 and n=2) can therefore have a transit time difference $\Delta t = (t_2 - t_1)$, which results from their difference in distance from the sound source. The greater the distance, the greater the transit time. Based on the transit time difference, the distance from the sound source can be determined or at least limited. If $t_2$ and $t_1$ are known, the relevant locations of the sound sources are in two dimensions at the intersection of two circles whose centers are located at the location of the sensors and whose radius corresponds to the transit times $t_2$ and $t_1$. In three dimensions there are corresponding spheres that intersect along a circle. If neither t2 nor t1 are known, but only their difference $\Delta t$, the distance from possible locations of the sound source can no longer be delimited, since the condition $\Delta t$=constant can be fulfilled ad infinitum.

What is described for the transit time can apply analogously to the sound pressure p (also referred to as signal level) or the sound pressure difference $\Delta p = (p_2 - p_1)$. The sound pressure p represents the amplitude of the sound which is present at the location where the sound is recorded, for example at the location of the sensor. The sound travels distance s (i.e., path s) from the source to the point of detection and loses sound pressure in the process. The sound pressure $p_n = p_n(s_n^2)$ is a function of the square of the distance $s_n$ for the nth location at which the sound is detected. The sound pressure p can thus be converted into a distance. The amplitude can be used as a measure of the sound pressure. For example, the time-dependent sound pressure is output as a time-dependent measurement signal whose amplitude (also referred to as signal amplitude or signal strength) represents the recorded sound pressure.

In the following, reference is therefore made, among other things, to the more general signal amplitude or its difference (also referred to as amplitude difference). With regard to the sound, the signal amplitude designates its time-dependent sound pressure; with regard to an electrical signal, its time-dependent electrical quantity (e.g., voltage and/or current intensity). An electrical signal that transports acoustic information can be understood as an audio signal. Sound can be understood as a mechanical signal that transports acoustic information.

In the following, reference is made to a self-service terminal (also referred to as a SB terminal), which is set up to record one or more than one product presented to it. Optionally, the self-service terminal can be set up to register the detected products and, based on this, to provide billing information for all the registered products (then also referred to as a self-service registration terminal). However, the self-service terminal (also referred to as an SCO terminal) does not necessarily have to be set up to register and/or provide the billing information. Examples of a less complex self-service terminal may include: a product weighing terminal, an information terminal, or the like. For example, the product weighing terminal can be used by the customer to weigh a product and receive a label indicating a price being called for the product. The information terminal can be set up, for example, to display a price that is called for the product to the customer upon request. It goes without saying that such functions can also be implemented by a self-service registration terminal, for example a self-service checkout terminal.

According to various embodiments, a speech pattern may be determined (also referred to as speech recognition) based on a digital audio signal. The speech pattern can graphically represent the content of a spoken user input (also referred to as speech input). A corresponding pattern recognition can be used for speech recognition, which is set up, for example, according to a predominant language or one selected by the user. For voice recognition, an optionally available analog audio signal can be digitized by sampling the analog audio signal. Furthermore, the digital audio signal can optionally be filtered and/or transformed into the frequency domain and a feature vector can be determined. Pattern recognition is then applied to the feature vector. The feature vector has interdependent or independent features that are generated from the digital audio signal (e.g., speech signal). An example of such a feature is the so-called cepstrum and/or frequency spectrum. The cepstrum is obtained from the frequency spectrum by forming the Fourier transform of the logarithmic magnitude spectrum. This allows different periodicities in the spectrum to be recognized. These periodicities are generated in the human vocal tract and by vocal cord stimulation, which can thus be reconstructed. Based on this, the content of the speech input can be determined.

The speech pattern can be assigned to a content of the speech input, for example by comparing it with reference patterns whose content is known. Examples of the content of the speech input may include: an instruction to the self-service terminal, information about the product, a choice between options presented to the user, a response to a query and/or prompt from the self-service terminal. Examples of the instruction to the self-service terminal include an instruction to start the registration session (session start event), an instruction to end the registration session (session end event), an instruction to accept a specific means of payment. Examples of options presented to the user include whether the user would like a printed invoice, whether the user would like to make another purchase, whether the user would like to register another product, whether the user would like to participate in a bonus program. Examples of information about the product include: the type of product, the number of products, an identifier of the product, a color of the product. Using the type of product (e.g., banana) as a speech input, the user can, for example, communicate which product he is currently weighing, so that the control device determines the identifier of the product based on the speech input.

Traditionally, there is no sound shielding in depth in speech recognition, which would be advantageous for the application (e.g., for voice control at the SCO terminal in retail).

According to various embodiments, a mechanism is provided for measuring transit time differences for signals originating from signal sources from which, in particular, the start time of transmission, e.g., in the case of voice signals, is unknown. This makes it easier to distinguish between the local origin (also referred to as the place of origin) of multiple signals, for example distinguishing between desired and undesired voice signals. This can be used as an alternative or in addition to conventional mechanisms for locating objects, in which, for example, a defined signal pulse (e.g., light or sound) is emitted and its transit time to the object and back to the transmitter is determined.

According to various embodiments, an offset microphone arrangement is provided, which is dependent, for example, on the expected position of the desired (speech) signal source. This provides a separation of the desired and undesired signals from one another in a simple and non-computing-intensive form, for example simply by adding the received signals from a plurality of microphones arranged offset from one another, without having to carry out special signal preprocessing or calculations.

Traditionally, at least 3 microphones are required to measure the direction of signal origin using so-called beamforming. However, the number of microphones required for the mechanism described herein can be, for example, two microphones.

According to various embodiments, the recognition of voice signals in the highly noisy checkout environment is made easier. A challenge here is not only to recognize the direction but also the distance of the respective useful signal source (speaker or customer) in front of the SCO terminal (with the microphones) and to distinguish it from interference sources in order to separate them from one another and suppress the interference signals. If one can assume that the customer (speaker, i.e., source of the useful signal) is standing close in front of the SCO terminal and the interference source (other interfering speakers, i.e., source of the interfering signal) is at least behind it, it is possible to distinguish between the useful signal and the interference signal via the propagation of the acoustic waves (also referred to as sound) and the resulting transit time difference and/or sound pressure difference (measurable via a multiple microphone arrangement). Ideally, 3 or more, but at least 2 microphones brought together in a suitable manner can be used for this.

Figure 1:
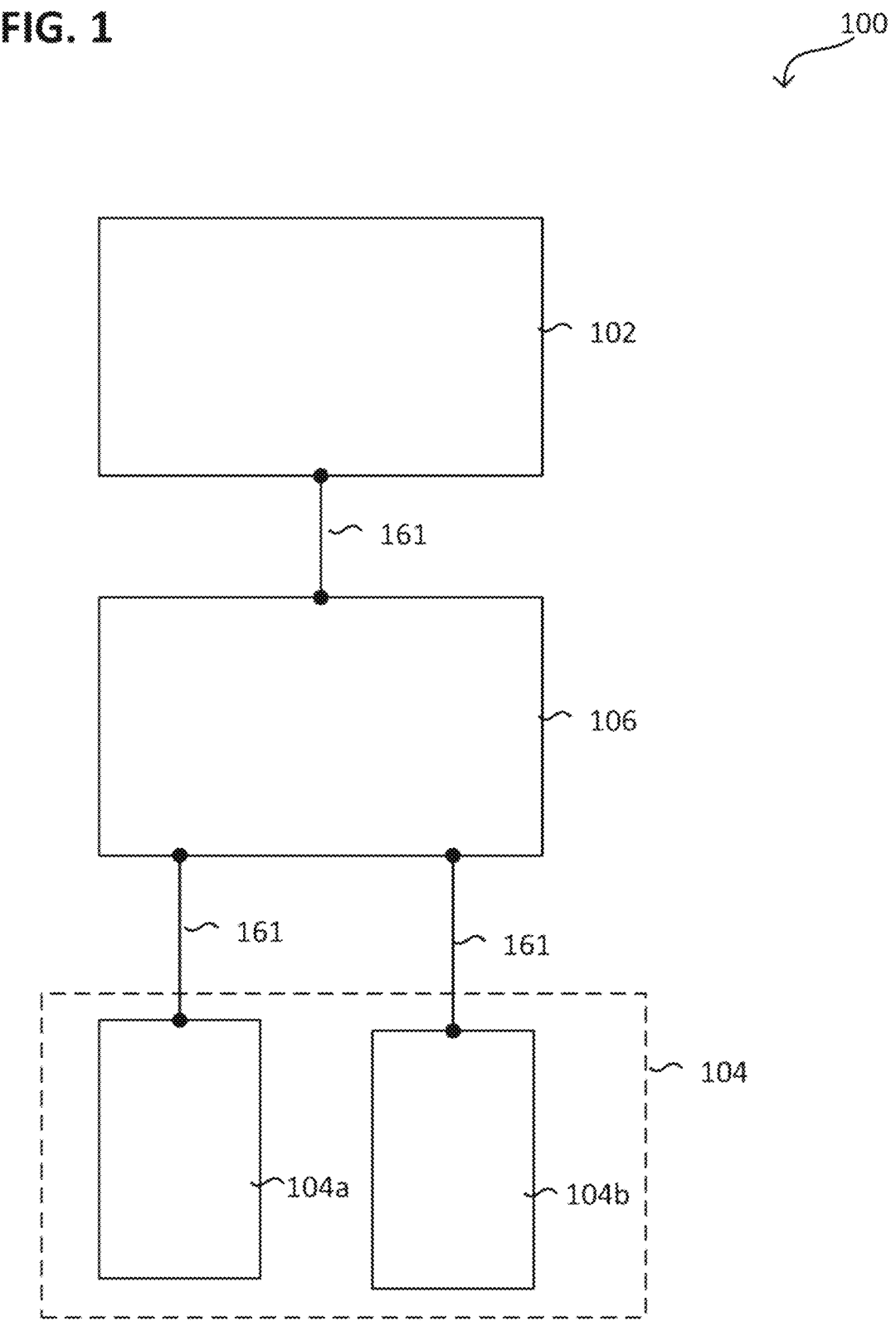
FIG. 1 shows a self-service terminal according to various embodiments in a schematic structural diagram.

FIG. 1 illustrates a self-service terminal 100 according to various embodiments in a schematic structural diagram; The self-service terminal 100 can be, for example, a self-service registration terminal 100.

The self-service terminal 100 can have one or more than one product detection device 102, several (i.e., two or more) acoustic sensors 104a, 104b and a control device 106. The components of the self-service terminal 100 that communicate with one another can be communicatively coupled 161 to the control device 106, for example by means of a fieldbus communication network 161 or other signal connections. Thus, the acoustic sensors 104a, 104b and the or each product detection device 102 can be communicatively 161 coupled to the control device 106.

The product detection device 102 can be set up to detect a property of a product (also referred to as a product property), e.g., a mechanical product property, an optical product property and/or a coded product property. The mechanical product property can have, for example, a size, a shape and/or a weight. The optical product property can have, for example, a color or a pattern. The encoded product property can have, for example, an encoded identifier and/or an encoded indication of the product.

The product detection device 102 can have, for example, an image detection device for detecting the optical property. The image detection device can be set up to supply the control device 106 with image data of a detection area (e.g., in raw data format or in a preprocessed version of the raw data format), e.g., pixel-based image data (also referred to as raster graphics). The image detection device 102 may include, for example, one or more than one camera.

The product detection device 102 may include, for example, an identifier detection device. The identifier detection device can be set up to supply the control device 106 with a product identifier that it has detected. The product identifier can, for example, be uniquely assigned to a product or its type. The product identifier can be determined, for example, on the basis of an optical feature (also referred to as an identifier feature) of the product that is detected. The identifier (e.g., a pattern) can have a machine-readable code that represents the product identifier, e.g., a binary code or the like. For example, the identification feature can have a barcode or another machine-readable code.

The product detection device 102 can have, for example, a scale for detecting the weight of the product. The scale can have, for example, one or more than one weight sensor that detects the weight.

An acoustic sensor 104a, 104b (hereinafter simply referred to as a microphone) can have, for example, a sound converter or be formed from it. The sound converter can be set up to convert an acoustic signal into an electrical signal (also referred to as an audio signal). The sound converter can, for example, have a pressure gradient microphone, a pressure microphone or the like, be active or passive, convert inductively, capacitively or resistively.

The microphones 104a, 104b can be part of a user interface 104 implemented by means of the control device or separately therefrom. By means of the user interface 104, for example, an acoustic speech input can be detected, e.g., a speech input. The product detection device 102 and the user interface 104 can have a corresponding infrastructure (e.g., having a processor, storage medium and/or bus system) or the like, which implements a measurement chain. The measuring chain can be set up to control the corresponding sensors (e.g., camera, scanner, microphone, etc.), to process their measured variable as an input variable and based on this to provide an electrical signal as an output variable, e.g., the product identifier, an audio signal, a weight value, or the like.

Each of the microphones 104a, 104b can be set up by means of the measurement chain to convert sound (input variable) recorded by the microphone into a corresponding electrical output variable (also referred to as an audio signal). The audio signal can be, for example, an analog or digital audio signal. The audio signal can optionally be pre-processed, e.g., sampled, filtered, sequenced, normalized and the like. The audio signal can represent an acoustic signal (also referred to as sound) detected by the sensor, for example its sound pressure or alternating sound pressure as a function of time (also referred to below as amplitude). The pressure fluctuations of a compressible sound transmission medium (e.g., air) that occur during the propagation of sound are referred to as sound pressure.

The digital audio signal can be provided, for example, by sampling the analog audio signal. To do this, the analog audio signal is transmitted in a series of scalar values, with the sampling rate determining how many scalar values are recorded per unit of time. The sampling can include digitizing the analog (continuous) audio signal, i.e., converting it into a digital audio signal. The digital audio signal can optionally be or will be stored as a file (also referred to as audio data).

In the following, reference is made to the processing of the digital audio signals, for example by means of a digitalsignal processor (also referred to as a DSP). As an alternative or in addition to the digital audio signals, the analog audio signal can also be further processed, for example by means of an analog circuit. What has been described for the digital audio signals thus applies analogously to analog audio signals. To process an analog audio signal, a DSP can also be connected between an analog-to-digital converter and a digital-to-analog converter.

The product detection device 102 can be used to determine the individual product properties by product. The area from which the product detection device 102 can be operated, for example by presenting the product to it, is also referred to below as the operating area.

The (for example spherical) operating area can be formed from those points in space which are at a distance from the product detection device 102 of less than an operating range.

In other words, the operating area can be arranged close to the product detection device 102, for example directly in front of it. For example, the operating area ange may be less than about 5 m (meters), e.g., less than about 2.5 m, e.g., less than about 1 m. Alternatively or additionally, the product detection device 102 can adjoin the operating area or extend into it.

Alternatively or additionally, the operating area can be at a distance from a surface on which the self-service terminal 100 is arranged, for example more than approximately 1 m (e.g., approximately 1.5 m) and/or less than approximately 3 m (e.g., approximately 2.5 m).

Clearly, the operating area can be the area in which the head of a user who wants to interact (e.g., physically) with the product detection device 102 is most likely located, so that the head is located within the operating area range. For example, these eligible head positions may be limited due to arm length.

Detecting the product properties may include presenting a product to be detected to the product detection device 102. The presentation can include, for example, the product to be detected being arranged in a product detection zone and its identifier being aligned in the direction of the product detection device 102. The presentation can include, for example, the product to be detected being placed on a surface which is monitored by a sensor of the product detection device 102.

The product detection device 102, the user interface 104 and the control device 106 do not necessarily have to have dedicated infrastructures. For example, their information-processing functions can also be provided as components of the same circuit and/or software (also referred to as an application) that is executed by one or more than one processor of the self-service terminal 100. It goes without saying that multiple applications and/or multiple processors can also be used, which provide the information-processing functions of the product detection device 102, the user interface 104 and the control device 106.

Figure 2:
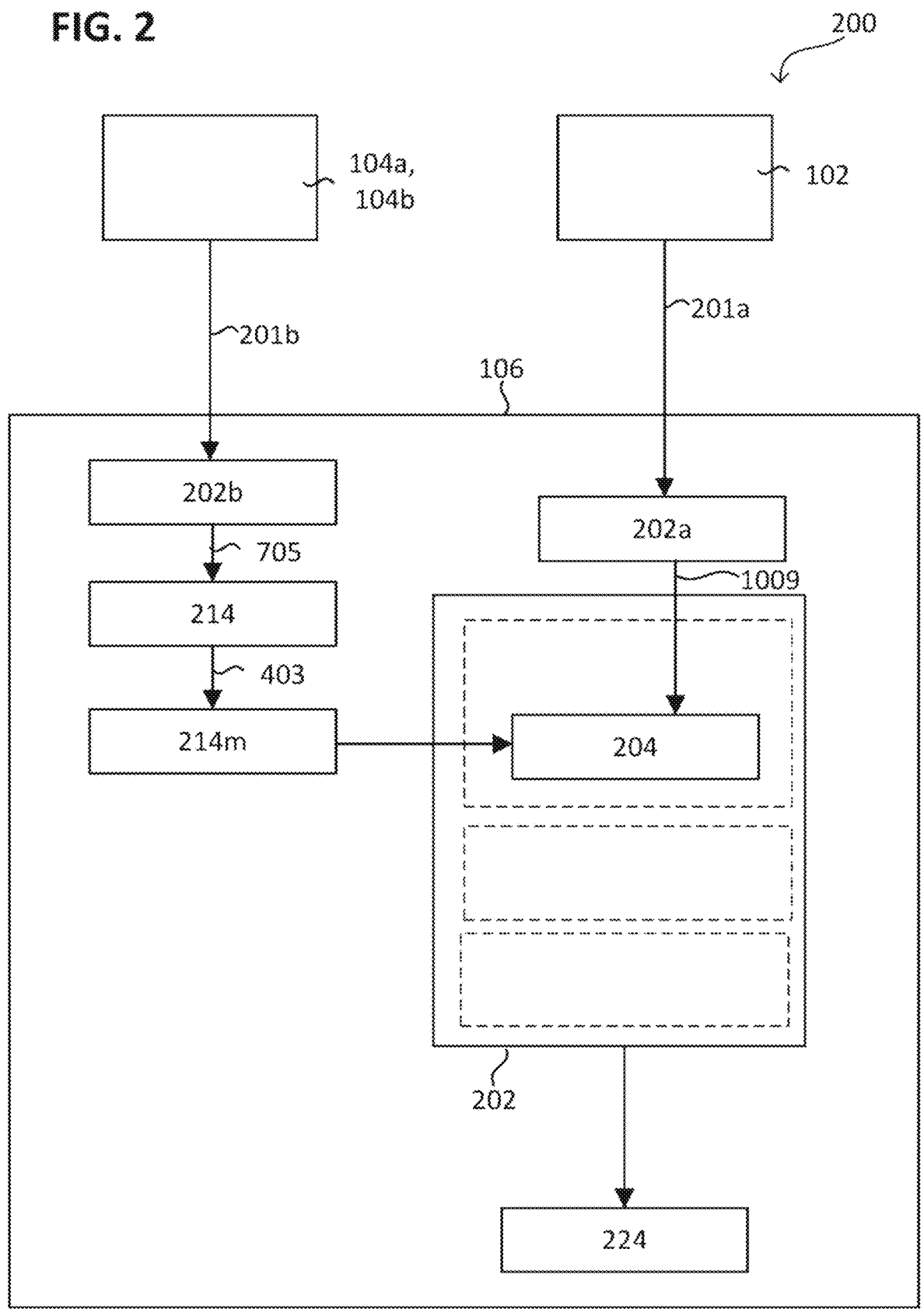
FIG. 2 shows a self-service terminal according to various embodiments in a schematic communication diagram.

FIG. 2 illustrates a self-service terminal 100 according to various embodiments 200 in a schematic communication diagram.

The product detection device 102 can be set up to supply 201a the control device 106 with a detected product property 202a. Furthermore, audio signals 202b can be provided 201b by means of the microphones 104a, 104b. The audio signals 202b can represent the sound detected by the microphones 104a, 104b.

The control device 106 can be set up to determine 1009 payment information 204 based on the product property 202a (also referred to as determining payment information). The payment information 204 can clearly represent which price is called up for the corresponding product with the product property 202a. For example, the recorded product property 202a can be compared with a database.

For example, the control device 106 can be set up to start a registration session 202, e.g., in response to a determined event (also referred to as a session start event), which represents that a self-service registration is to take place. Examples of the session start event may include a user standing in front of the self-service terminal 100 and/or making a corresponding entry thereon, a product being presented to the product detection device 102, and/or a previous registration session being ended.

Similarly, the control device 106 can be set up to end a registration session 202, e.g., in response to a determined event (also referred to as a session end event), which represents that a self-service registration billing is to occur. Examples of the session end event can include a user making a corresponding entry at the self-service terminal 100. Examples of the session end event may include a bank card or other means of payment being captured by the self-service terminal 100 and/or that a predefined period of time has elapsed since the last product was captured.

To end the registration session 202, the control device 106 can be set up to determine billing information 224 and to display it using a display device of the self-service terminal 100. The payment information 204 determined during a registration session 202 can be aggregated, for example, and the result of the aggregation can be added to the billing information 224. The billing information 224 can clearly indicate what amount is to be paid for the registered products. The billing information 224 can optionally include additional information, such as the share of taxes, a list of the products recorded, an itemized list of the payment information 204, or the like.

The control device 106 can be set up to determine 403 a speech pattern 214m based on the audio signals 202b. Speech pattern 214m may represent spoken language input (e.g., instructions or information about the product). To determine the speech pattern 214m, the audio signals 202b can be superimposed 705 on one another. A result 214 (also referred to as a superimposition signal 214) from this can then be fed to the determination 403 of the speech pattern 214m.

The control device 106 can also be set up to provide the payment information 204 based on the speech pattern 214m. Alternatively or in addition to the payment information, other information can also be provided.

Figure 3:
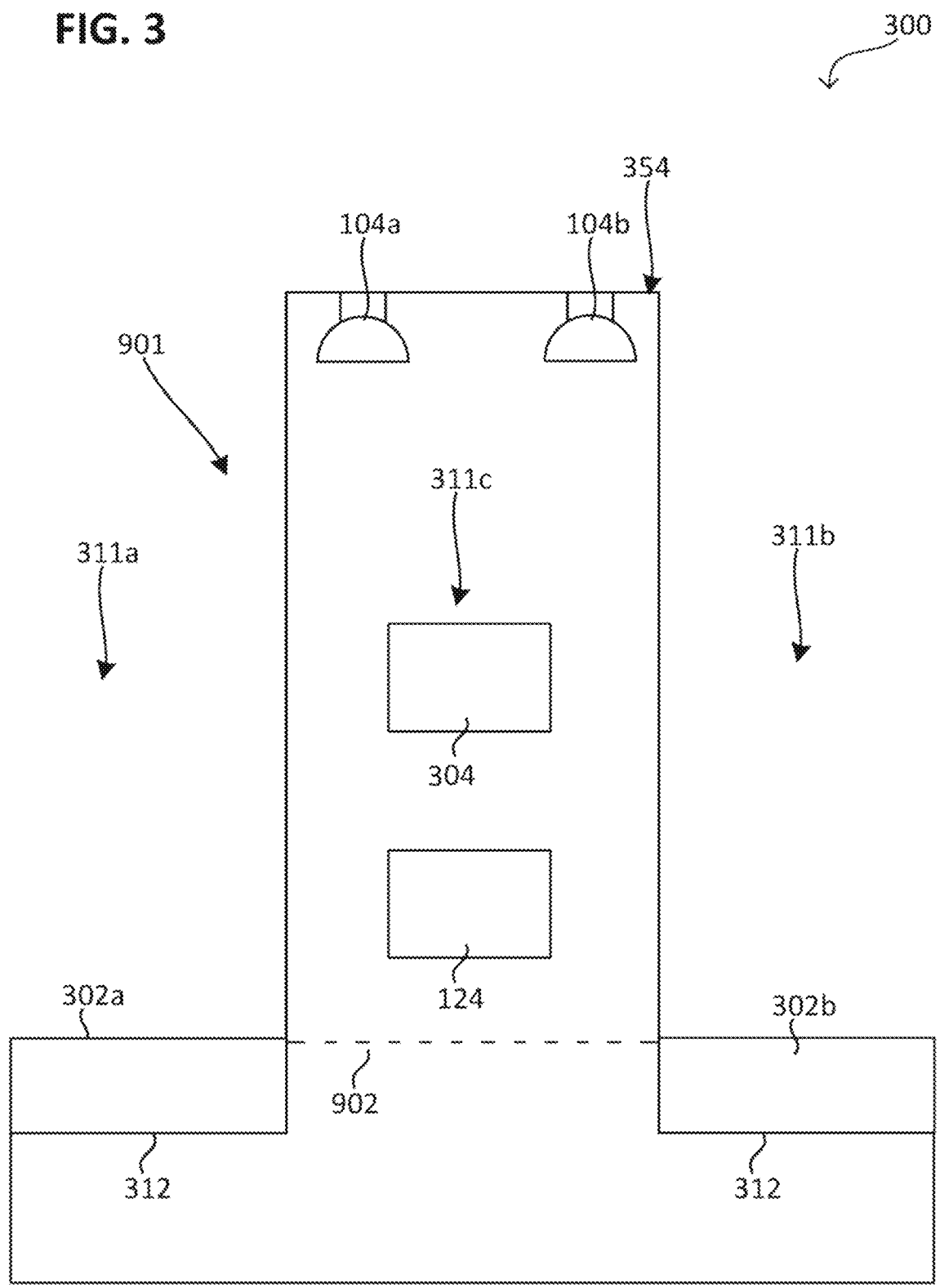
FIG. 3 shows a self-service terminal according to various embodiments in a schematic side view.

FIG. 3 illustrates a self-service terminal 100 according to various embodiments 300 in a schematic side view, for example set up like the embodiments 200.

In general, the self-service terminal 100 can have a supporting structure, by means of which various components of the self-service terminal 100 are supported, for example one or more than one storage device 302a, 302b, the microphones 104a, 104b, the product detection device 304, the control device (not shown), etc. The support structure can have, for example, a frame and a housing attached thereto, wherein the housing houses the sensitive components of the self-service terminal 100. The supporting structure can have, for example, a base with which the supporting structure stands on a substrate and a vertically extending section 354 (also referred to graphically as a column) which supports the elevated components, e.g., a display device 124 and/or the identifier detection device 304.

The self-service terminal 100 can have a number of sub-areas (also referred to as zones). The multiple zones can have, for example, a first zone 311a (also referred to as an input zone 311a), in which a first storage device 302a of the self-service terminal 100 is arranged. The multiple zones can have, for example, a second zone 311b (also referred to as a storage zone 311b), in which a second storage device 302b of the self-service terminal 100 is arranged. The multiple zones may include, for example, the product detection zone as a third zone 311c (also referred to as a scan zone 311c).

The or each storage device 302b, 302a can be set up in such a way that one or more than one product can be placed on it. For this purpose, a storage device 302b, 302a can have, for example, a storage shelf, a storage hook for bags and/or a storage table. Optionally, the or each storage device 302b, 302a can have a scale 312 as a product detection device, which is set up to detect a weight of the products placed on the storage device.

The display device 124 of the self-service terminal 100 can optionally define an information output device 124. The information output device 124 can be set up, for example, to output the information output by the control device as information perceivable (e.g., audible or visible) by humans, for example by means of a display device. The information can include, for example, a request and/or assistance for the user.

FIG. 4 illustrates the self-service terminal 100 in a method 400 according to various embodiments in a schematic side view or cross-sectional view, wherein the method 400 is implemented, for example, by the control device 106. The method 400 is described using a number of three microphones 104a, 104b, 104c. By analogy, what has been described can apply to one of three different numbers of microphones, for example two microphones or more than three microphones.

The method may include detecting a spoken user input 401 (also referred to as speech input) using each microphone of the plurality of microphones 104a, 104b, 104c. The speech input can generally be transmitted using an acoustic vibration that propagates through space (also referred to as a sound wave). The amplitude A of the acoustic oscillation can depend on the distance s and the time t, so that $A=A(s, t)$.

The speech input can be transmitted by means of sound waves, which hit the nth microphone at a time $t_n$ that depends on the distance $s_n$ of the nth microphone from the source 402 of the speech input. The propagating sound is illustrated in Figure as the spatial distribution of sound wavefronts 401a, 401b (also referred to as wavefront) at the time $t=t_1$, at which the speech input hits the first microphone 104a. The sound wave fronts 401a, 401b each represent areas $r(t=t_1)$ of uniform sound pressure in space with the exemplary distance $\Delta r=c_s \cdot \Delta t$ from one another.

The source 402 of the speech input can be a person (also referred to as a user). However, the source 402 of the speech input 401 (also referred to as input source 402) can also be a synthetic input source 402, for example to calibrate the mechanism described herein, as will be described in more detail later.

At time $t_2=t_1-\Delta t$, a first wavefront 401a of the acoustic speech input can have passed the middle, second microphone 104b and at the same time (i.e., $t_1=t_3$) reach the outer microphones 104a, 104c (e.g., to the left and right of it). A second wave front 401b of the acoustic speech input reaches the middle microphone 104b at this point in time $t=t_1$, but is still at a distance from the outer microphones 104a, 104b, so that they will only reach them at a later point in time $t=t_1+\Delta t$.

Thus, for each of the wave fronts 401a, 401b, a transit time difference $\Delta t$ arises, which clearly indicates the time difference between the times of impingement on different microphones. The transit time difference $\Delta t$ between the microphones on the outside and in the center can be used to determine which position the input source 402 has relative to the plurality of microphones 104a, 104b, 104c (also referred to as the transit time mechanism). For example, it can be determined which sound source (or which speaker) is located closer to the plurality of microphones 104a, 104b, 104c or further away. As described above, due to the symmetry $t_1=t_3$, the third microphone 104c can optionally be omitted.

In a similar way, it can be exploited that the further a wavefront moves away from its input source 402 the thinner it becomes, i.e., it loses in amplitude (e.g., the sound pressure).

As a result, each of the wave fronts 401a, 401b can exert a greater sound pressure on the middle microphone 104b than on the outer microphones 104a, 104c. Based on this difference in amplitude (hereinafter simply referred to as the sound pressure difference) the position of the input source 402 relative to the plurality of microphones 104a, 104b, 104c (also referred to as the amplitude mechanism) can also be determined.

The amplitude mechanism and the delay mechanism can be used alternatively to each other or together. For example, only the amplitude mechanism or only the delay mechanism can be used.

For example, it can be determined whether the input source 402 is arranged centrally in front of the plurality of microphones or is offset in time to them, e.g., via the transit time difference and/or sound pressure difference.

Optionally, the microphones 104a, 104b, 104c can also be arranged in such a way that their distance $s_n$ from the source 402 of the speech input is the same. This achieves that the microphones 104a, 104b, 104c are "focused" (also referred to as the focus position) to a fixed position in space, which is the target position of a sound source that is to be constructively amplified. If the target position is to deviate from the position at a uniform distance (focus position) from the microphones 104a, 104b, 104c, this can be taken into account by means of a calibration and/or by means of a distance sensor, as will be described in more detail later.

The target position can generally be arranged in the operating area 901.

FIG. 5 illustrates the self-service terminal 100 in the method 400 according to various embodiments 500 in a schematic side view or cross-sectional view. The method 500 is described using a number of three microphones 104a, 104b, 104c. By analogy, what has been described can apply to one of three different numbers of microphones, for example two microphones or more than three microphones.

The method may include detecting an acoustic interference noise 501 using each microphone of the plurality of microphones 104a, 104b, 104c. In analogy to the speech input, the acoustic interference noise 501 can be transmitted by means of an additional acoustic oscillation, which propagates in space (also referred to as the sound wave). The source 502 of the interference noise 501 can be, for example, a person (also referred to as a disturber), an event or a device. The source 502 of the interference noise 501 (also referred to as interference source 502) can also be, for example, a synthetic source.

In the illustrated example, the interference source 502 may be a greater distance from the plurality of microphones 104a, 104b, 104c than the input source 402. However, what has been described for this example can also apply by analogy to the fact that the input source 402 is at a greater distance from the plurality of microphones 104a, 104b, 104c than the interference source 502.

For example, the interference source 502 can be arranged centrally behind the user 402 in front of the self-service terminal 100.

A first wavefront 501a of the interference noise 501 reaches the multiple microphones (far left, center, and far right), for example, substantially simultaneously. In other words, the transit time difference and/or the sound pressure difference between the microphones on the outside and in the middle can be smaller (up to ideally zero) than for the speech input 401.

Clearly, the interference source 502 can be arranged further away from the self-service terminal than the user 402 of the self-service terminal and the detected interference signal can now be filtered out by superimposing the audio signals, for example by means of an inverted signal superimposition or another mechanism for noise compensation (also referred to as "noise cancelling").

FIGS. 6A and 6B illustrate the self-service terminal 100 in the method 400 according to various embodiments 600a, 600b in schematic perspective views, implemented, for example, by means of the control device 106. As illustrated, the plurality of microphones 104a, 104b, 104c may be positioned one above the other and/or above the product sensing device 102. As described above, a third microphone 104c may be optional (represented here by a cross).

FIGS. 7A and 7B illustrate the self-service terminal in the method 400 according to various embodiments 700a, 700b in schematic detailed views, implemented, for example, by means of the control device 106. The self-service terminal 100 can optionally have a payment device 702, e.g., an EC reading device 702.

According to various embodiments, the microphones 104a, 104b can be at an identical distance from the operating area 901 or from the target position. This allows the speech input 401 to have little or no transit time difference or sound pressure difference, and thus makes it easier to filter out the interference noise 501.

The interference noise 501 (e.g., a interference conversation) can reach two microphones of the plurality of microphones 104a, 104b, 104c at different times, which results in the transit time difference Δt. The speech input 401, on the other hand, can reach the plurality of microphones 104a, 104b, 104c simultaneously, for example at a first point in time $t=t_1$ at which the first wavefront 501a of the interference noise 501 reaches the first microphone 104a. The dashed line represents the first wavefront 501a of the interference noise at a second point in time $t_2=t_1+\Delta t$, at which it reaches the second microphone 104b.

FIG. 8A and FIG. 8B illustrate the method 400 according to different embodiments in different schematic diagrams 800a, 800b, 800c, in which an acoustic variable 801 (e.g., the sound pressure) is plotted over time 803.

The respective acoustic signal (i.e., the sound), which is detected by means of the first acoustic sensor 104a and the second acoustic sensor 104b (also generally referred to as signal detection), has the acoustic speech input 401 (also generally referred to as the useful signal) and the interference noise (also referred to as an interference signal). In this example, the place of origin (i.e., the place of the corresponding source 402, 502) of the speech input 401 or the interference noise 501 is such that they match in their distance from the first sensor 104a and differ in their distance from the second sensor 104b. Furthermore, the place where the speech input 401 is generated (i.e., its origin) is arranged at the focus position of the microphones 104a, 104b, so that a transit time difference Δt only occurs for the interference noise 501. In general, however, the respective places of origin can also be arranged differently.

Diagram 800a shows an acoustic speech input 401 detected by means of the first acoustic sensor 104a and an interference noise 501 detected by means of the first acoustic sensor 104a. The speech input 401 and the interference noise 501 differ, for example, from one another e.g., in the place of their origin, in their course over time and/or in their peak value. The difference in peak value is also known as the signal-to-noise ratio (also known as SNR*).

Diagram 800b shows an acoustic speech input 401 detected by means of the second acoustic sensor 104b and an interference noise 501 detected by means of the second acoustic sensor 104b. The speech input 401 and the interference noise 501 differ in terms of their transit time with regard to the second acoustic sensor 104b, which is identified as the transit time difference Δt.

Diagram 800c shows the result of the superimposition of the acoustic signal (also referred to as the first measurement signal) recorded by the first acoustic sensor 104a and the acoustic signal (also referred to as the second measurement signal) recorded by the second acoustic sensor 104b. The result of the superimposition is also referred to below as the superimposed signal. In this example, the recorded acoustic measurement signals (e.g., their amplitude over time) are added.

In general, however, a more complex mapping can also be used, which maps the recorded acoustic measurement signals onto the superimposed signal. The superimposed signal then has the interference noise superimposed on one another with a time offset (also referred to as interference superimposition 511) and the speech input superimposed constructively on one another (also referred to as input superimposition 411).

For example, the mapping can have one or more than one transformation that is applied to each of the acquired acoustic measurement signals. Examples of transformations can include: a (e.g., temporal) shift, a (e.g., temporal) compression and/or a (e.g., temporal) stretching. For example, the mapping can have one or more than one link that is applied to a pair of the acquired acoustic measurement signals. Examples of a link include: an addition, a substruction, a convolution, or the like. The link can have several digits, e.g., two digits or more than two digits.

Since the peak value of the speech input 401 is detected by both sensors essentially at the same point in time $t_1=t_2$, their peak value is essentially doubled during the addition. Since the peak value of the interference noise 401 is detected by the two sensors at different points in time $t_2=t_1+\Delta t$, their peak value is changed only insignificantly during the addition.

The resulting signal-to-noise ratio (SNR') of the input superimposition 411 to that of the interference superimposition 511 is greater than the signal-to-noise ratio of the first measurement signal and/or the signal-to-noise ratio of the second measurement signal.

In a similar way, the sound pressure difference can be used to increase the signal-to-noise ratio by means of superimposition.

In this example, the location of origin (i.e., the location of the corresponding source 402, 502) of the speech input 401 and the interference noise 501 was arranged such that they have the same distance from the first sensor 104a and a different distance from the second sensor 104b. In general, however, more complex configurations can also be taken into account, as will be explained in more detail below.

For example, the interference source 502 can be at least twice as far away from the self-service terminal 100 (e.g., its microphones) as the input source 402.

FIG. 9A, FIG. 9B and FIG. 9C illustrate the self-service terminal 100 according to various embodiments 900a, 900b, 900c in a schematic side view, in which the operating area 901 and an exemplary user 402 therein are illustrated. The user's head as an input source 402 is arranged, for example, at a target position in the operating area 901 with regard to the plurality of microphones 104a, 104b. Furthermore, a wavefront 401a is drawn in, which has an equidistant distance from the target position.

The target position can, for example, be at a distance from the ground in a range of approximately 1.5 m to approximately 2.5 m, for example approximately 2 m. The target position can, for example, be at a distance from the product detection device 102 in a range of approximately 0.5 m to approximately 1 m.

Each of the plurality of sensors 104a, 104b can be at a distance (also referred to as sensor distance) from the operating area 901. The sensor distance can be in a range from approximately 10% of the operating range to approximately 1000% of the operating range, for example.

In embodiments 900a and 900b, the two sensors differ in their distance from the user 402 and/or from the target position.

The self-service terminal according to embodiment 900a has a distance sensor 902, which is set up to detect a distance 913 (also referred to as source distance 913) from an object in the operating area 901, e.g., the user 402. The control device 106 can be set up to determine a transit time difference on the basis of the source distance 913. The transit time difference can, for example, satisfy the relation $\Delta t = d_Q / c_s$, where $d_Q$ designates the source distance 913. The first measurement signal and the second measurement signal can be time-shifted relative to one another by the transit time difference Δt, wherein the measurement signals that are time-shifted relative to one another are linked (e.g., added) to one another.

In general, the distance sensor 902 can be set up to emit a signal and to detect its reflection. Examples of a distance sensor 902 include: a light distance sensor 902 (e.g., utilizing light reflection) and/or an acoustic distance sensor 902 (e.g., utilizing acoustic reflection).

The self-service terminal 100 according to the embodiment 900b, for example its control device 106, has a data memory in which a predefined transit time difference Δt is stored. The specified transit time difference Δt can be determined, for example, by calibrating the self-service terminal 100. The first measurement signal and the second measurement signal can be time-shifted relative to one another by the transit time difference Δt, wherein the measurement signals that are time-shifted relative to one another are linked (e.g., added) to one another. Alternatively or additionally, the amplitude difference can be determined and stored in an analogous manner.

The calibration can include that a test signal source is arranged at the location of the target position and emits an acoustic test signal, and that a time difference between the detection of the test signal using the first microphone 104a and the detection of the test signal using the second microphone 104a is determined. The time difference can then be saved as the transit time difference Δt.

In embodiments 900a and 900b, the two sensors 104a, 104b have the same distance from the user 402 and/or the target position, i.e., their focus position can correspond to the target position. The two sensors 104a, 104b are clearly aligned with the target position in the operating area 901. In that case, the transit time difference Δt=0 and the two measurement signals can be linked to one another without a time offset. The first acoustic sensor 104a has a first front face 105a and the second acoustic sensor 104b has a second front face 105b. The first front face 105a and the second front face 105b are spaced from one another along an arc 107 that has a first radius and is contained in a vertical plane, which is the plane of view of FIG. 9c. As also shown in FIG. 9c, the first front face 105a and the second front face 105b are both tangent to the arc 107 and the product detection device 102 is below the arc 107.

FIG. 10 illustrates the method 400 according to an embodiment 1000 in a schematic flowchart. In FIG. 10 at 1000a, multiple audio signals 1002 are recorded with a time offset relative to one another using the multiple microphones 104a, 104b, 104c. In FIG. 10 at 1000b, the time axes of the recorded audio signals 1002 are offset in time in pairs by the same transit time difference Δt (also referred to as constant time compensation). In FIG. 10 at 1000c, the time-compensated audio signals 1002 are superimposed (e.g., summed) on one another, so that a superimposed signal 214 is obtained.

For a pair of (e.g., immediately adjacent) microphones 104a, 104b (also referred to as a sensor pair), those signals are constructively superimposed on each other whose origin satisfies the relation $\Delta s = \Delta t \cdot c_s$, where $\Delta s$ denotes the difference in the distances to the microphones 104a, 104b. For example, $\Delta s = s_1 - s_2$ may be.

The relation $\Delta s = \Delta t \cdot c_s$ is fulfilled for an infinite number of points on a surface 1001 (also referred to as transit time difference surface 1001). The points on the transit time difference surface 1001 meet the condition that their distance $s_1$ from the first microphone 104a and their distance $s_2$ from the second microphone 104b satisfy the relation $\Delta t = t_1 - t_2 = s_1/c_s - s_2/c_s$, so that $s_1 - s_2 = \Delta t \cdot c_s$ is constant. The same applies to any other pair of sensors 104b, 104c. In this way, interference sources that lie next to the transit time difference surface 1001 can be effectively filtered out, since their signals are no longer completely time-corrected and are partially destructively superimposed. This constant time compensation can be applied very well to a sound source at a great distance, i.e., the sensor distance $s_n$ is much greater than the distance between the sensors in a sensor pair.

If, on the other hand, the sensor distance $s_n$ is smaller, an adapted time compensation of the audio signals is used, as will be explained in more detail below.

FIG. 11 illustrates the method 400 according to various embodiments 1100 in a schematic flowchart. In FIG. 11 at 1100a, multiple audio signals 1002 are recorded with a time offset relative to one another using the multiple microphones 104a, 104b, 104c. In FIG. 11 at 1100b, the time axes of the recorded audio signals 1002 are offset in time in pairs by an adjusted transit time difference Δt (also referred to as adjusted time compensation). A transit time difference Δt(m, n) can be assigned to the kth sensor pair, which has the nth sensor and the mth sensor, so that $S_m - S_n = \Delta t(m, n) \cdot c_s$. This means that the transit time difference surfaces 1001 that result for each pair of sensors intersect each other, e.g., in a straight line. The calculation for Δt(m=1, n=2) and Δt(m=2, n=3) is shown as an example. In this way, interference sources that are adjacent to the intersection 1211 of the transit time difference surface 1001 can be effectively filtered out, since their signals are no longer completely time-corrected and are partially destructively superimposed. In FIG. 11 at 1100c, the time-compensated audio signals 1002 are superimposed (e.g., summed) on one another, so that a superimposed signal 214 is obtained.

In this way, the sensor distance that a sound source has for a constructive superimposition is also limited, for example between a maximum and a minimum distance. Each pair of sensors can thus eliminate one degree of freedom for the position of the sound source. With three sensors, three transit time differences Δt(m=1, n=2), Δt(m=1, n=3) and Δt(m=2, n=3) can be used, so that no degree of freedom is left for the sound source. Depth filtering can thus be effectively provided.

The same adaptive time compensation mechanism can also be used for fewer than three or more than three microphones. For example, the sound pressure can be used alternatively or additionally in order to limit the distance from the sound source. Due to the quadratic dependence of the sound pressure $p_n = p_n(s_n^2)$ on the distance $s_n$, the locations of a sound source for which there is a constructive superimposition are on a different surface, so that when using the sound pressure difference there is also one degree of freedom per sensor pair can be eliminated.

FIG. 12A to FIG. 12C each illustrate a self-service terminal 100 according to various embodiments 1200a, 1200b, 1200c in a schematic side view looking along a horizontal plane containing an axis 1203. The horizontal plane containing the axis 1203 can be transverse to a gravitational direction 1201. The horizontal plane can be at a distance from a surface on which the self-service terminal 100 is arranged, for example more than approximately 1 m (e.g., approximately 1.5 m) and/or less than approximately 3 m (e.g., approximately 2.5 m). With respect to embodiments 1200a, 1200b, 1200c, reference is made to a pair of microphones 104a, 104b. However, what has been described may also apply to more than one pair of microphones 104a, 104b, e.g., three microphones which, optionally, can be grouped into three different pairs. The transit time difference surface 1001 can correspond to that transit time difference $\Delta t=t_1-t_2=S_1/c_s-S_2/c_s$ according to which the measurement signals of the microphones 104a, 104b are superimposed with a time offset. Signal components whose origin lies on the transit time difference surface 1001 are thus constructively amplified by means of the signal processing.

In embodiment 1200a, the transit time difference surface 1001 may be oblique to the gravitational direction 1201. This achieves an intersection 1211 between the horizontal plane containing the axis 1203 and the transit time difference surface 1001. If several people of approximately the same size are standing one behind the other, only the sound emitted by the person whose mouth is as close as possible to the intersection 1211 between the horizontal plane containing the axis 1203 and the transit time difference surface 1001 is amplified.

In embodiment 1200b, the plurality of microphones can have one or more than one directional microphone 104a, the directivity of which is oblique to the direction of gravity 1201 and/or the transit time difference surface 1001, e.g., aligned with the horizontal plane containing the axis 1203 or the transit time difference surface 1001 (also as directivity 1213 designated). This achieves an intersection 1211 between the direction of directivity 1213 and the transit time difference surface 1001, even if the transit time difference surface 1001 is, for example, substantially parallel to the horizontal plane containing the axis 1203. If several people of approximately the same size are standing one behind the other, only the sound emitted by the person whose mouth is as close as possible to the intersection 1211 between the directivity 1213 and the transit time difference surface 1001 is amplified.

In embodiment 1200c, the two microphones 104a, 104b can be offset from one another with respect to the direction of gravity 1201. In other words, a connecting line between them can be oblique to the gravitational direction 1201. This achieves that the transit time difference surface 1001 is oblique to the gravitational direction 1201, even if the transit time difference $\Delta t=0$ is set. If the transit time difference $\Delta t=0$, then the transit time difference surface 1001 is arranged centrally between the two microphones 104a, 104b and is planar. For example, the focus position can lie on the intersection 1211 between the transit time difference surface 1001 and the horizontal plane containing the axis 1203.

By means of the embodiments 1200a, 1200b, 1200c, the area for which constructive interference occurs is thus narrowed in terms of its distance from the self-service terminal 100, so that people standing one behind the other are not identically amplified.

When the self-service terminal 100 is calibrated, the position of the origin of a test signal on the intersection 1211 can be located. The transit time difference and/or amplitude difference of the test signal based on this can be stored as an indication of the target position of a sound source (also referred to as the target origin) that is to be constructively amplified.

FIG. 13 illustrates the method 400 according to various specific embodiments 1300 in a schematic flow chart, which is implemented, for example, by means of the control device 106. An acoustic signal 1301 can be converted into a first audio signal 1311 by means of a first microphone 104a. The acoustic signal 1301 can be converted into a second audio signal 1313 by means of a second microphone 104a.

The superimposing may include mapping the first audio signal 1311 onto a superimposed signal 214 by means of a first filter 1323. The first filter 1323 can be a function of the second audio signal 1311. For example, the second audio signal 1311 can be mapped onto the first filter 1323.

A filter F can generally change the amplitude and/or the phase position of a (e.g., electrical) signal depending on a parameter $P_F$ (also referred to as a filter parameter). For example, the time or the amplitude can be selected as the filter parameter. The filter thus maps a first time-dependent signal curve $A_1(t)$ onto a second time-dependent signal curve $G_2(t)$, so that $F(A_1)=G_2$. For example, the filter can be formulated as a degree of change (e.g., attenuation or amplification) depending on the filter parameter $P_F$ such that the output of the filter is $G_2(t)=F(A_1(t),P_F)$. The mapping implemented by the filter can be, for example, a multiplication or an addition. It can be understood that a filter can be implemented using software and/or using hardware. Of course, other types of filters can also be used.

In a less complex implementation, an addition with the (optionally normalized) signal profile $A_2(t)$ of the second audio signal 1313 can be used as the first filter 1323. The first filter 1323 obtained in this way can, for example, specify a time-dependent factor $A_2(t)$ by which each amplitude value $A_1(t)$ is changed. Thus, for example, $G_2=A_1(t)+A_2(t)$ may be. In more general terms, the filter 1323 may be formed based on the second audio signal 1313.

In an analogous manner, if present, the acoustic signal 1301 can be converted into a third audio signal 1315 by means of a third microphone 104c, which is imaged on a second filter 1335. The second filter 1335 may map the previously obtained superimposed signal 214 to an additional superimposed signal 214. The processing chain thus provided can strengthen those signal components whose origin is close to the target position and/or attenuate those signal components whose origin is far from the target position.

One or more than one of the superimposed signals 214 can then be used to determine the speech pattern.

Various examples are described below which relate to what was described above and shown in the figures.

Example 1 is a self-service terminal comprising: a product detection device for detecting a property of a product; a plurality of acoustic sensors; and a control device configured to: superimposing a signal detected by the plurality of acoustic sensors; determining a speech pattern based on a result of the superimposition; outputting information based on the property and on the speech pattern; wherein the superimposition and a relative position of the plurality of acoustic sensors are configured to each other such that first components of the signal are attenuated relative to second components of the signal when an origin of the second components is located between the self-service terminal and an origin of the first components.

Example 2 is the self-service terminal according to example 1, wherein a degree of attenuation increases as a distance of the origin of the first constituents from the self-service terminal increases; and/or the smaller a distance of the origin of the second components from the self-service terminal is.

Example 3 is the self-service terminal according to example 1 or 2, wherein a degree of attenuation increases the greater a distance of the origin of the first components from a target origin is, according to which the superposition and the relative position of the plurality of acoustic sensors to each other are established; and/or the smaller a distance of the origin of the second components from the target origin is; wherein the target origin is, for example, a distance from the self-service terminal (e.g., less than about 1.5 m, e.g., less than about 1 m).

Example 4 is the self-service terminal according to one of examples 1 to 3, wherein the superimposition and a relative position of the plurality of acoustic sensors to one another are set up in such a way that the second components are constructively superimposed (e.g., only then) when their origin is located near (e.g at) a target origin and/or in an operating area of the product detection device.

Example 5 is the self-service terminal according to any one of examples 1 to 4, wherein the plurality of sensors match in their distance from the target origin.

Example 6 is the self-service terminal according to one of examples 1 to 5, further comprising: a position sensor which is set up to detect an indication of a position of the origin of the second components relative to the self-service terminal, wherein the superimposing takes into account the indication.

Example 7 is the self-service terminal according to example 5, wherein the position sensor comprises a distance sensor configured to detect as an indication a distance of the origin of the second components from the self-service terminal.

Example 8 is the self-service terminal according to one of examples 1 to 7, wherein the superimposing taking into account an indication that represents a position of the target origin (e.g., a target position of the origin of the second components relative to the self-service terminal), takes place, wherein the indication is, for example, stored, e.g., in a non-volatile memory of the control device.

Example 9 is the self-service terminal according to example 8, wherein the indication for the target origin has a temporal variable (e.g., transit time difference) and/or amplitude difference.

Example 10 is the self-service terminal according to any one of examples 1 to 9, wherein the information includes or is formed from payment information.

Example 11 is the self-service terminal according to any one of Examples 1 to 10, wherein the information is related to a detected product.

Example 12 is the self-service terminal according to one of examples 1 to 11, wherein the superimposition includes mapping the signal detected by each of the plurality of acoustic sensors to an additional signal, which is fed to the determination of a speech pattern.

Example 13 is the self-service terminal according to one of examples 1 to 12, wherein the superimposition comprises superimposing two signal curves detected by means of the plurality of acoustic sensors with a time offset to one another (e.g., based on the time of detection and/or on a time stamp of the signal curves).

Example 14 is the self-service terminal according to one of examples 1 to 13, wherein the superimposition includes changing the amplitude of two signal curves detected by means of the plurality of acoustic sensors relative to one another.

Example 15 is the self-service terminal according to any one of examples 1 to 14, wherein the origin of the second components and the origin of the first components are on a plane, wherein the plane is transverse to a gravitational direction and/or wherein at least two sensors of the plurality acoustic sensors differ from each other at a distance from the plane.

Example 16 is the self-service terminal according to one of examples 1 to 15, wherein the determination of a speech pattern comprises comparing the result of the superimposition with an acoustic reference speech input, wherein the reference speech input is stored, for example, in a non-volatile memory of the control device.

Example 17 is the self-service terminal according to any one of examples 1 to 16, further comprising: an electronic component coupled to the control device; wherein the control device is further configured to determine control information based on the speech pattern; and to control the component of the self-service terminal using the control information.

Example 18 is the self-service terminal according to example 17, wherein the component has a payment device and/or a scale; and/or wherein the control information represents a product selection.

Example 19 is the self-service terminal according to any one of examples 1 to 18, wherein the property comprises a machine-readable code.

Example 20 is the self-service terminal according to any one of examples 1 to 19, wherein the property has a weight.

Example 21 is the self-service terminal according to any one of examples 1 to 20, wherein the second components include speech input; and/or wherein the first components have an interference noise.

Example 22 is the self-service terminal according to one of examples 1 to 21, wherein (e.g., with respect to a gravitational direction) at least two sensors of the plurality of acoustic sensors are arranged one above the other and/or at different vertical heights.

Example 23 is the self-service terminal according to any one of examples 1 to 22, wherein at least two sensors of the plurality of acoustic sensors differ less from each other in a distance from the target origin than in a distance from the origin of the first components.

Example 24 is the self-service terminal according to any one of examples 1 to 23, wherein at least two sensors of the plurality of acoustic sensors differ less from each other in a distance from the origin of the second component than in a distance from the origin of the first components.

Example 25 is the self-service terminal according to any one of examples 1 to 24, wherein at least two sensors of the plurality of acoustic sensors are at substantially the same distance from the origin of the second components and/or the target origin; and/or differ from each other in a distance from the origin of the first components and/or the target origin.

Example 26 is the self-service terminal according to any one of examples 1 to 25, wherein the superimposing comprises performing signal addition and/or signal subtraction.

Example 27 is the self-service terminal according to one of examples 1 to 26, wherein the plurality of acoustic sensors have exactly two sensors and/or wherein the superimposition takes place only on the basis of the signal detected by two sensors of the plurality of acoustic sensors.

Example 28 is the self-service terminal according to example 27, wherein the superimposing includes performing noise cancellation.

Example 29 is the self-service terminal according to any one of examples 1 to 28, wherein the product detection device defines an operating area from which it can be operated, wherein the origin of the second components and/or the target origin is arranged in the operating area; and/or wherein the origin of the first components is located outside the operating area.

Example 30 is the self-service terminal according to any of examples 1 to 29, wherein the origin of the second components and the origin of the first components lie on a straight line directed towards the self-service terminal.

Example 31 is a method for calibrating the self-service terminal according to any one of examples 1 to 30, the method comprising: detecting a test signal using the plurality of acoustic sensors; determining an indication (e.g., transit time difference and/or an amplitude difference) which represents a position of the origin of the test signal relative to the self-service terminal; and storing the indication by means of the control device.

Example 32 is a method comprising: superimposing a signal detected by a plurality of acoustic sensors; determining a speech pattern based on a result of the superimposition; outputting a control signal based on the speech pattern; wherein the superimposing and relative location of the plurality of acoustic sensors to each other are configured such that first components of the signal are attenuated relative to second components of the signal when an origin of the second components is located between the plurality of acoustic sensors and an origin of the first components.

Example 33 is the subject matter (e.g., self-service terminal or method) according to any of examples 1 to 32, wherein the superimposing comprises a signal sensed by a first sensor of the plurality of acoustic sensors and a signal sensed by a second sensor of the plurality of acoustic sensors to superimpose one another.

Example 34 is the subject matter (e.g., self-service terminal or method) according to any one of examples 1 to 33, wherein the superimposing comprises a first result (e.g., an output of the first sensor, a measurement result or an audio signal) of detecting the signal using a first sensor of the plurality of acoustic sensors and a second result (e.g., an output variable of the second sensor, a measurement result or an audio signal) of the detection of the signal by means of a second sensor of the plurality of acoustic sensors to superimpose one another.

Example 35 is the subject matter (e.g., self-service terminal or method) according to any one of examples 1 to 34, wherein the plurality of acoustic sensors include a first sensor which is configured (e.g., as a result of detecting) a first output variable (e.g., a measurement result or an audio signal) which represents the signal detected by the first sensor.

Example 36 is the subject matter (e.g., self-service terminal or method) according to any one of examples 1 to 35, wherein the plurality of acoustic sensors include a second sensor which is configured (e.g., as a result of detecting) a second output variable (e.g., a measurement result or an audio signal) which represents the signal detected by the second sensor.

The invention claimed is:

1. A self-service terminal comprising:
   a product detection device configured to detect a property of a product and including at least one of an image detection device, an identifier detection device, and a scale;
   a user interface including a display device configured to display information associated with a transaction including the product;
   a plurality of acoustic sensors including at least a first acoustic sensor and a second acoustic sensor, wherein the first acoustic sensor has a first front face and the second acoustic sensor has a second front face, wherein the first front face and the second front face are spaced from one another along an arc that has a first radius and is contained in a vertical plane, wherein the first front face and the second front face are both tangent to the arc and wherein the product detection device is below the arc; and
   a control device configured to:
      superimpose a first signal detected by the first acoustic sensor of the plurality of acoustic sensors and a second signal detected by the second acoustic sensor of the plurality of acoustic sensors to establish a relative position of the plurality of acoustic sensors and produce a resulting signal;
      determine a speech pattern based on a result of the superimposition of the first signal and the second signal; and
      output information based on the property and on the speech pattern;
   wherein the superimposition of the first signal and the second signal and positions of the plurality of acoustic sensors relative to one another are such that first components of the first signal are attenuated relative to second components of the second signal when an origin location of the second components is between the self-service terminal and an origin location of the first components; and
   wherein the resulting signal includes acoustic speech input from a customer and wherein interference noise from a greater distance from the self-service terminal than the origin location has been filtered out.

2. The self-service terminal according to claim 1, wherein the superimposition of the first signal and the second signal and the relative position of the plurality of acoustic sensors are such that the second components are only constructively superimposed when their origin is arranged close to a target origin.

3. The self-service terminal according to claim 2, wherein the plurality of acoustic sensors match in their distance from the target origin.

4. The self-service terminal according to claim 2, wherein the superimposition of the first signal and the second signal takes place taking into account a stored indication that represents a position of the target origin.

5. The self-service terminal according to claim 4, wherein the indication comprises a propagation time difference and/or an amplitude difference.

6. The self-service terminal according to claim 1, wherein the information is payment information.

7. The self-service terminal according to claim 1, wherein the superimposition of the first signal and the second signal includes mapping the signal detected by each of the plurality of acoustic sensors onto an additional signal which is fed to the determined speech pattern.

8. The self-service terminal according to claim 1, wherein the origin of the second components and the origin of the first components lie on a plane, the plane is transverse to a direction of gravity.

9. The self-service terminal according to claim 1, further comprising:
   an electronic component coupled to the control device;
   wherein the control device is further configured to:
      determine control information based on the speech pattern; and
      control the component using the control information.

10. The self-service terminal according to claim 9, wherein the component comprises a payment device.

11. The self-service terminal according to claim 1, wherein the property comprises a machine-readable code.

12. The self-service terminal according to claim 1, wherein at least two sensors of the plurality of acoustic sensors are arranged one above the other.

13. The self-service terminal according to claim 1, wherein the product detection device defines an operating area from which it can be operated, wherein the origin of the second components is arranged in the operating area.

14. A method for calibrating a self-service terminal, the method comprising:
  providing a self-service terminal including:
    a product detection device configured to detect a property of a product and including at least one of an image detection device, an identifier detection device, and a scale;
    a user interface including a display device configured to display information associated with a transaction including the product;
    a plurality of acoustic sensors including at least a first acoustic sensor and a second acoustic sensor, wherein the first acoustic sensor has a first front face and the second acoustic sensor has a second front face, wherein the first front face and the second front face are spaced from one another along an arc that has a first radius and is contained in a vertical plane, wherein the first front face and the second front face are both tangent to the arc and wherein the product detection device is below the arc; and
    a control device configured to:
      superimpose a first signal detected by the first acoustic sensor of the plurality of acoustic sensors and a second signal detected by the second acoustic sensor of the plurality of acoustic sensors to establish a relative position of the plurality of acoustic sensors and produce a resulting signal;
      determine a speech pattern based on a result of the superimposition of the first signal and the second signal; and
      output information based on the property and on the speech pattern;
      wherein the superimposition of the first signal and the second signal and positions of the plurality of acoustic sensors relative to one another are such that first components of the first signal are attenuated relative to second components of the second signal when an origin location of the second components is between the self-service terminal and an origin location of the first components;
      wherein the resulting signal includes acoustic speech input from customer and wherein interference noise from a greater distance from the self-service terminal than the origin location has been filtered out;
      detecting a test signal using the plurality of acoustic sensors;
      determining an indication that represents a position of the origin location of the test signal relative to the self-service terminal; and
      storing the indication with the control device.

15. A method of operating a self-service terminal comprising:
  providing a self-service terminal including:
    a product detection device configured to detect a property of a product and including at least one of an image detection device, an identifier detection device, and a scale;
    a user interface including a display device configured to display information associated with a transaction including the product;
    a plurality of acoustic sensors including at least a first acoustic sensor and a second acoustic sensor, wherein the first acoustic sensor has a first front face and the second acoustic sensor has a second front face, wherein the first front face and the second front face are spaced from one another along an arc that has a first radius and is contained in a vertical plane, wherein the first front face and the second front face are both tangent to the arc and wherein the product detection device is below the arc; and
    a control device configured to:
      superimpose a first signal detected by the first acoustic sensor of the plurality of acoustic sensors and a second signal detected by the second acoustic sensor of the plurality of acoustic sensors to establish a relative position of the plurality of acoustic sensors and produce a resulting signal;
      determine a speech pattern based on a result of the superimposition of the first signal and the second signal; and
      output information based on the property and on the speech pattern;
      wherein the superimposition of the first signal and the second signal and positions of the plurality of acoustic sensors relative to one another are such that first components of the first signal are attenuated relative to second components of the second signal when an origin location of the second components is between the self-service terminal and an origin location of the first components;
      superimposing a first signal detected by the first sensor of the plurality of acoustic sensors and a second signal detected by the second sensor of the plurality of acoustic sensors;
      determining a speech pattern based on a result of the superimposing; and
      outputting a control signal based on the speech pattern;
      wherein the superimposition of the first signal and the second signal and positions of the plurality of acoustic sensors relative to one another are such that the first components of the first signal are attenuated relative to the second components of the second signal when an origin location of the second components is located between the plurality of acoustic sensors and the origin location of the first components; and
      wherein the resulting signal includes acoustic speech input from the origin location where interference noise from a greater distance from the self-service terminal than the customer has been filtered out.

* * * * *